United States Patent
Sashima et al.

(10) Patent No.: US 9,453,993 B2
(45) Date of Patent: Sep. 27, 2016

(54) VARIABLE MAGNIFICATION OPTICAL SYSTEM, OPTICAL DEVICE, AND PRODUCTION METHOD FOR VARIABLE MAGNIFICATION OPTICAL SYSTEM

(71) Applicant: Nikon Corporation, Tokyo (JP)

(72) Inventors: Tomoyuki Sashima, Tokyo (JP); Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/700,398

(22) Filed: Apr. 30, 2015

(65) Prior Publication Data

US 2015/0247995 A1 Sep. 3, 2015

Related U.S. Application Data

(63) Continuation of application No. PCT/JP2013/079239, filed on Oct. 29, 2013.

(30) Foreign Application Priority Data

Oct. 30, 2012 (JP) ................. 2012-238732
Oct. 30, 2012 (JP) ................. 2012-238733

(51) Int. Cl.
*G02B 15/20* (2006.01)
*G02B 15/167* (2006.01)
(Continued)

(52) U.S. Cl.
CPC .......... *G02B 15/167* (2013.01); *G02B 13/006* (2013.01); *G02B 13/009* (2013.01);
(Continued)

(58) Field of Classification Search
CPC ............ G02B 15/167; G02B 13/0045; G02B 13/009; G02B 13/006; G02B 15/20; G02B 13/18; G02B 15/173; G02B 27/646
See application file for complete search history.

(56) References Cited

U.S. PATENT DOCUMENTS 5,973,854 A 10/1999 Shimo
7,068,440 B1 6/2006 Nakatani et al.
(Continued)

FOREIGN PATENT DOCUMENTS

JP 04-060509 A 2/1992
JP 05-027172 A 2/1993
(Continued)

OTHER PUBLICATIONS

English Translation of International Preliminary Report on Patentability from International Patent Application No. PCT/JP2013/079239, May 14, 2015.
(Continued)

*Primary Examiner* — Joseph P Martinez
(74) *Attorney, Agent, or Firm* — Shapiro, Gabor and Rosenberger, PLLC

(57) ABSTRACT

Composing, in order from an object side: a first lens group having positive refractive power; a second lens group having negative refractive power; a third lens group having positive refractive power; a fourth lens group having positive refractive power; and a fifth lens group having positive refractive power; upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied; and the given conditional expressions being satisfied; thereby providing a small-size variable magnification optical system having a high zoom ratio and an excellent optical performance.

18 Claims, 15 Drawing Sheets

(51) Int. Cl.
*G02B 13/18* (2006.01)
*G02B 15/173* (2006.01)
*G02B 13/00* (2006.01)
*G02B 27/64* (2006.01)

(52) U.S. Cl.
CPC ........... *G02B13/0045* (2013.01); *G02B 13/18* (2013.01); *G02B 15/173* (2013.01); *G02B 15/20* (2013.01); *G02B 27/646* (2013.01)

(56) References Cited

U.S. PATENT DOCUMENTS

| | | |
|---|---|---|
| 7,286,304 B1 | 10/2007 | Ohtake |
| 7,508,593 B2 | 3/2009 | Nishimura |
| 7,561,787 B2 | 7/2009 | Nose |
| 7,755,844 B2 | 7/2010 | Take |
| 2006/0291843 A1 | 12/2006 | Nose |
| 2007/0217026 A1 | 9/2007 | Nishimura |
| 2007/0263299 A1 | 11/2007 | Ohtake |
| 2009/0086334 A1 | 4/2009 | Take |
| 2013/0215518 A1 | 8/2013 | Mitsuhashi |
| 2013/0300868 A1 | 11/2013 | Yamamoto |

FOREIGN PATENT DOCUMENTS

| | | | |
|---|---|---|---|
| JP | 06-130300 A | 5/1994 | |
| JP | 10-161028 A | 6/1998 | |
| JP | 2004-117827 A | 4/2004 | |
| JP | 2004-252169 | * 9/2004 | ............. G02B 15/14 |
| JP | 2004-252196 A | 9/2004 | |
| JP | 2005-017915 A | 1/2005 | |
| JP | 2006-195071 A | 7/2006 | |
| JP | 2007-003652 A | 1/2007 | |
| JP | 2007-248952 A | 9/2007 | |
| JP | 2007-292994 A | 11/2007 | |
| JP | 2009-086437 A | 4/2009 | |
| JP | 2013-171207 A | 9/2013 | |
| JP | 2013-178298 A | 9/2013 | |
| WO | WO 2012/090757 A1 | 7/2012 | |
| WO | WO 2012/102105 A1 | 8/2012 | |
| WO | WO 2013/065391 A1 | 5/2013 | |
| WO | WO 2013/151153 A1 | 10/2013 | |

OTHER PUBLICATIONS

International Search Report from International Patent Application No. PCT/JP2013/079239, Feb. 10, 2014.

* cited by examiner

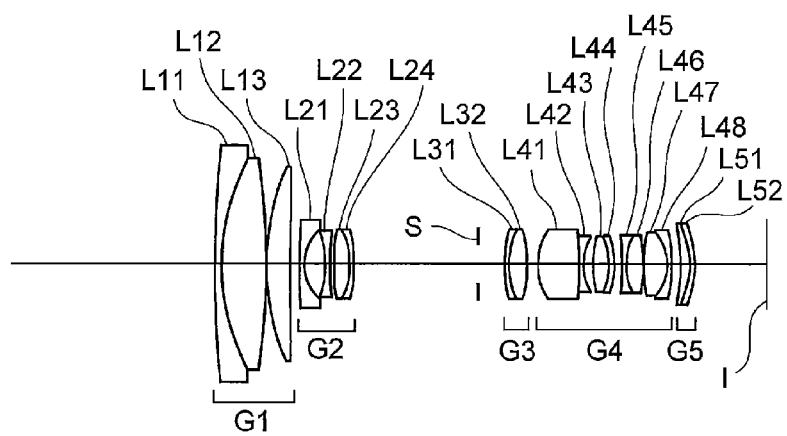
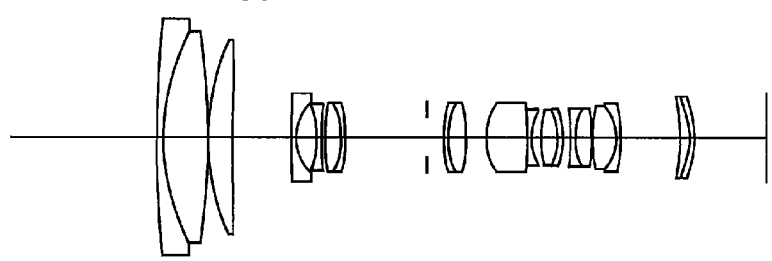
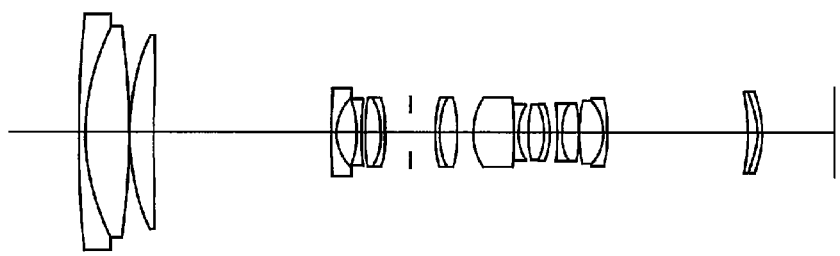
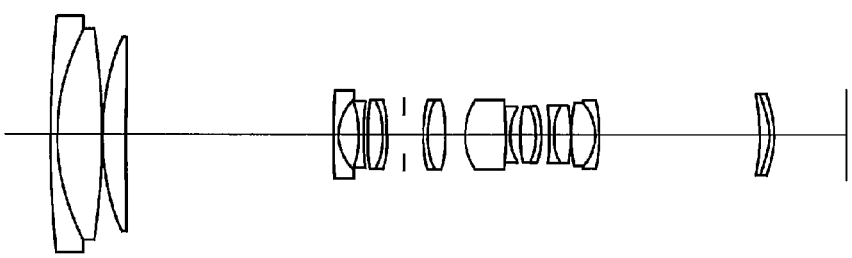
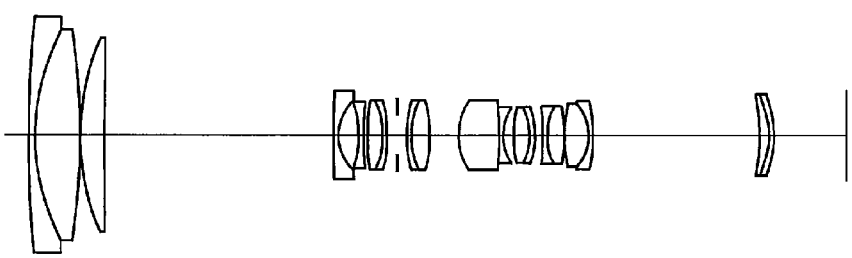

VARIABLE MAGNIFICATION OPTICAL SYSTEM, OPTICAL DEVICE, AND PRODUCTION METHOD FOR VARIABLE MAGNIFICATION OPTICAL SYSTEM

TECHNICAL FIELD

The present invention relates to a variable magnification optical system, an optical device, and a production method for the variable magnification optical system.

BACKGROUND ART

There have been proposed, as a variable magnification optical system suitable for an interchangeable lens for cameras, a digital still camera, a video camera or the like, many variable magnification optical systems which comprise a most object side lens group having positive refractive power (for example, see Japanese Patent application Laid-Open No. 2007-292994).

PRIOR ART DOCUMENT

Patent Document

Patent Document 1: Japanese Patent application Laid-Open Gazette No. 2007-292994

SUMMARY OF THE INVENTION

Problem to be Solved by the Invention

However, in the conventional variable magnification optical system as described above, there was a problem that it was difficult to conduct downsizing while retaining a high zoom ratio and also attaining a sufficiently excellent optical performance.

The present invention is made in view of the above-described problem, and has an object to provide a small-size variable magnification optical system having a high zoom ratio and an excellent optical performance, an optical apparatus, and a method for manufacturing the variable magnification optical system.

Means for Solving the Problem

In order to solve the above-mentioned problems, according to the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group having positive refractive power;

upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied; and the following conditional expressions being satisfied:

$$7.60 < f5/fw < 45.00$$

$$0.430 < (d4it - d4iw)/f4 < 0.700$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from a lens surface on a most image side of the fourth lens group to the image plane in the telephoto end state.

Further, according to the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group having positive refractive power;

upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied; and the following conditional expressions being satisfied:

$$11.80 < f5/fw < 32.00$$

$$0.170 < f4/f5 < 0.510$$

$$0.065 < (d4it - d4iw)/f5 < 0.300$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Further, according to the present invention, there is provided an optical apparatus equipped with the variable magnification optical system.

Further, according to the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group having positive refractive power; the method comprising the steps of:

arranging the fourth lens group and the fifth lens group to satisfy the undermentioned conditional expressions; and arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied:

$$7.60 < f5/fw < 45.00$$

$$0.430 < (d4it - d4iw)/f4 < 0.700$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Further, according to the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group having positive refractive power; the method comprising the steps of:

arranging the fourth lens group and the fifth lens group to satisfy the undermentioned conditional expressions; and arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied:

$11.80 < f5/fw < 32.00$ $0.170 < f4/f5 < 0.510$ $0.065 < (d4it - d4iw)/f5 < 0.300$ where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Effect of the Invention

According to the present invention, there can be provided a small-size variable magnification optical system having a high zoom ratio and an excellent optical performance, an optical apparatus, and a method for manufacturing the variable magnification optical system.

BRIEF DESCRIPTION OF THE DRAWINGS

FIGS. 1A, 1B, 1C, 1D and 1E are sectional views showing a variable magnification optical system according to a First Example of the first and second embodiments of the present application, in a wide-angle end state, in a first intermediate focal length state, in a second intermediate focal length state, in a third intermediate focal length state and in a telephoto end state, respectively.

EMBODIMENTS FOR CARRYING OUT THE INVENTION

Figure 2A:
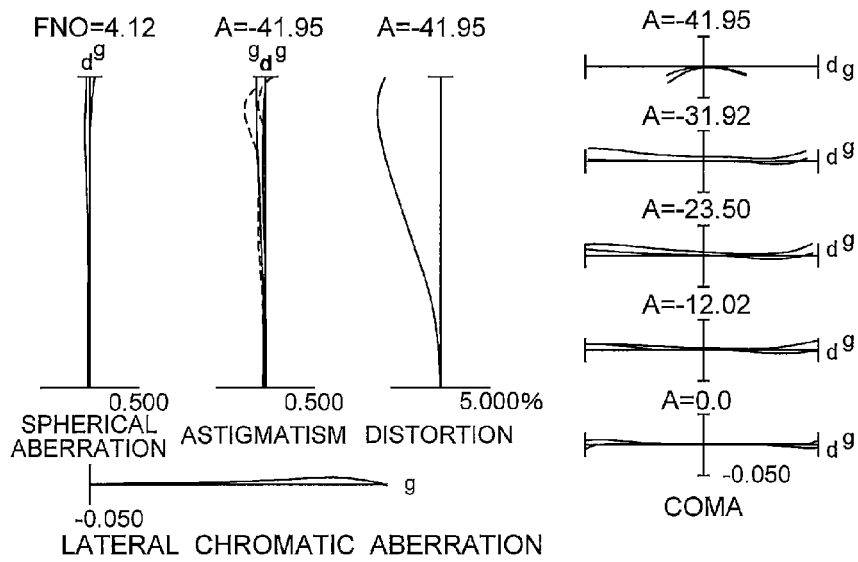
FIGS. 2A, 2B and 2C are graphs showing various aberrations of the variable magnification optical system according to the First Example of the first and second embodiments of the present application upon focusing on an infinite distance object, in the wide-angle end state, in the first intermediate focal length state, and in the second intermediate focal length state, respectively.

A variable magnification optical system, an optical apparatus and a method for manufacturing the variable magnification optical system, according to the first and second embodiments of the present application are explained below.

The variable magnification optical system according to the first embodiment of the present application comprises, in order from an object side: a first lens group having positive refractive power; a second lens group having negative refractive power; a third lens group having positive refractive power; a fourth lens group having positive refractive power; and a fifth lens group having positive refractive power; wherein upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied. With this configuration, the variable magnification optical system of the present application can realize zooming from the wide angle end state to the telephoto end state and suppress respective variations in distortion, astigmatism and spherical aberration, associated with the zooming.

Further, with the configuration that the fifth lens group has positive refractive power, a usable magnification of the fifth lens group becomes smaller than an equi-magnification. As a result, it is possible to relatively lengthen a composite focal length of the first to fourth lens groups, so that influence of decentering coma aberration and the like due to eccentricity among the lenses in the first lens group to the fourth lens groups caused during manufacturing can be suppressed to be relatively small. Consequently, it is possible to provide a variable magnification optical system having a high optical performance.

Further, in the variable magnification optical system according to the first embodiment of the present application, the following conditional expressions (1-1) and (1-2) are satisfied:

$$7.60 < f5/fw < 45.00 \quad (1\text{-}1)$$

$$0.430 < (d4it - d4iw)/f4 < 0.700 \quad (1\text{-}2)$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

The conditional expression (1-1) defines an adequate range of the focal length of the fifth lens group. With satisfying the conditional expression (1-1), the variable magnification optical system according to the first embodiment of the present application can suppress variations in astigmatism and distortion upon zooming.

In the variable magnification optical system according to the first embodiment of the present application, when the value of f5/fw is equal to or falls below the lower limit value of the conditional expression (1-1), it becomes difficult to suppress variations in astigmatism caused in the fifth lens group upon zooming, so that a high optical performance cannot be realized. Further, a lens diameter of the fifth lens group becomes larger. Meanwhile, in order to attain the advantageous effect of the present application more surely, it is more preferable to set the lower limit value of the conditional expression (1-1) to 11.80.

On the other hand, in the variable magnification optical system according to the first embodiment of the present application, when the value of f5/fw is equal to or exceeds the upper limit value of the conditional expression (1-1), it becomes difficult to, in the fifth lens group, suppress variations in astigmatism and distortion caused in the fourth lens group upon zooming, so that a high optical performance cannot be realized. Further, a composite focal length of the first to fourth lens groups becomes shorter and hence influence of decentering coma aberration and the like due to eccentricity among the lenses in the first to fourth lens groups caused during manufacturing becomes larger relatively, so that a high optical performance cannot be realized. Meanwhile, in order to attain the advantageous effect of the present application more surely, it is more preferable to set the upper limit value of the conditional expression (1-1) to 32.00.

The conditional expression (1-2) defines an adequate range of a distance from a lens surface on a most image side of the fourth lens group to an image plane upon zooming from the wide-angle end state to the telephoto end state. With satisfying the conditional expression (1-2), the variable magnification optical system according to the first embodiment of the present application can suppress a variations astigmatism upon zooming.

In the variable magnification optical system according to the first embodiment of the present application, when the value of (d4it−d4iw)/f4 is equal to or falls below the lower limit value of the conditional expression (1-2), a composite focal length of the first to third lens groups becomes shorter relatively and hence it becomes difficult to suppress a variation in astigmatism caused in the first to third lens groups upon zooming, so that a high optical performance cannot be realized. Meanwhile, in order to attain the advantageous effect of the present application more surely, it is more preferable to set the lower limit value of the conditional expression (1-2) to 0.520.

On the other hand, in the variable magnification optical system according to the first embodiment of the present application, when the value of (d4it−d4iw)/f4 is equal to or exceeds the upper limit value of the conditional expression (1-2), it becomes difficult to suppress a variation in astigmatism caused in the fourth lens group upon zooming, so that a high optical performance cannot be realized. Meanwhile, in order to attain the advantageous effect of the present application more surely, it is more preferable to set the upper limit value of the conditional expression (1-2) to 0.680.

With configuring as described above, it is possible to realize a small-size variable magnification optical system having a high zoom ratio and a high optical performance.

Further, in the variable magnification optical system according to the first embodiment of the present application, it is preferable that the following conditional expression (1-3) is satisfied:

$$0.410 < f3/f4 < 1.000 \quad (1\text{-}3)$$

where f3 denotes a focal length of the third lens group, and f4 denotes a focal length of the fourth lens group.

The conditional expression (1-3) defines an adequate range of a ratio of the focal length of the third lens group to that of the fourth lens group. With satisfying the conditional expression (1-3), the variable magnification optical system according to the first embodiment of the present application can suppress variations in spherical aberration and astigmatism upon zooming.

In the variable magnification optical system according to the first embodiment of the present application, when the value of f3/f4 is equal to or falls below the lower limit value of the conditional expression (1-3), it becomes difficult to suppress variations in spherical aberration and astigmatism caused in the third lens group upon zooming, so that a high optical performance cannot be realized. Meanwhile, in order to attain the advantageous effect of the present application more surely, it is more preferable to set the lower limit value of the conditional expression (1-3) to 0.550.

On the other hand, in the variable magnification optical system according to the first embodiment of the present application, when the value of f3/f4 is equal to or exceeds the upper limit value of the conditional expression (1-3), it becomes difficult to suppress variations in spherical aberration and astigmatism caused in the fourth lens group upon zooming, so that a high optical performance cannot be realized. Meanwhile, in order to attain the advantageous effect of the present application more surely, it is more preferable to set the upper limit value of the conditional expression (1-3) to 0.880.

With configuring as described above, it is possible to realize a small-size variable magnification optical system having a high zoom ratio and a high optical performance.

Further, in the variable magnification optical system according to the first embodiment of the present application, it is preferable that the following conditional expression (1-4) is satisfied:

$$-0.050 < (d3t - d3w)/fw < 0.750 \quad (1\text{-}4)$$

where fw denotes a whole system focal length of the variable magnification optical system in the wide-angle end state, d3w denotes a distance on the optical axis from a lens surface on a most image side of the third lens group to a lens surface on a most object side of the fourth lens group in the wide-angle end state, and d3t denotes a distance from the lens surface on the most image side of the third lens group to the lens surface on the most object side of the fourth lens group in the telephoto end state.

The conditional expression (1-4) defines an adequate range of the distance on the optical axis from the lens surface on the most image side of the third lens group to the lens surface on the most object side of the fourth lens group, upon zooming from the wide-angle end state to the telephoto end state. With satisfying the conditional expression (1-4), the variable magnification optical system according to the first embodiment of the present application can suppress variations in coma aberration and astigmatism upon zooming.

In the variable magnification optical system according to the first embodiment of the present application, when the value of (d3t−d3w)/fw is equal to or falls below the lower limit value of the conditional expression (1-4), it becomes difficult to suppress a variation in astigmatism caused in the third lens group upon zooming, so that a high optical performance cannot be realized. Meanwhile, in order to attain the advantageous effect of the present application more surely, it is more preferable to set the lower limit value of the conditional expression (1-4) to 0.000.

On the other hand, in the variable magnification optical system according to the first embodiment of the present application, when the value of (d3t−d3w)/fw is equal to or exceeds the upper limit value of the conditional expression (1-4), it becomes difficult to suppress a variation in coma aberration caused in the fourth lens group upon zooming, so that a high optical performance cannot be realized. Meanwhile, in order to attain the advantageous effect of the present application more surely, it is more preferable to set the upper limit value of the conditional expression (1-4) to 0.500.

Further, in the variable magnification optical system according to the first embodiment of the present application, it is preferable that the first lens group is moved toward the object side upon zooming from the wide-angle end state to the telephoto end state. With this configuration, it is possible to suppress a variation in height from the optical axis of an off-axis beam passing through the first lens group upon zooming. Consequently, it is possible to suppress a variation in astigmatism upon zooming in addition to decrease of a diameter of the first lens group.

Further, in the variable magnification optical system according to the first embodiment of the present application, it is preferable that a distance between the first lens group and the second lens group is increased upon zooming from the wide-angle end state to the telephoto end state. With this configuration, it is possible to make a magnification of the second lens group larger, so that variations in spherical aberration and astigmatism upon zooming can be suppressed while realizing a high zoom ratio effectively.

Further, in the variable magnification optical system according to the first embodiment of the present application, it is preferable that a distance between the second lens group and the third lens group is decreased upon zooming from the wide-angle end state to the telephoto end state. With this configuration, it is possible to make a composite magnification of the third lens group and the fourth lens group larger, so that variations in spherical aberration and astigmatism upon zooming can be suppressed while realizing a high zoom ratio effectively.

Further, in the variable magnification optical system according to the first embodiment of the present application, it is preferable that a distance between the fourth lens group and the fifth lens group is increased upon zooming from the wide-angle end state to the telephoto end state. With this configuration, it is possible to make a composite magnification of the third lens group and the fourth lens group larger, so that variations in spherical aberration and astigmatism upon zooming can be suppressed while realizing a high zoom ratio effectively.

Further, in the variable magnification optical system according to the first embodiment of the present application, it is preferable that the fifth lens group is fixed in a position upon zooming from the wide-angle end state to the telephoto end state. With this configuration, it is possible to vary a height from the optical axis of marginal light rays made incident on the fifth lens group from the fourth lens group upon zooming and thereby more excellently suppress a variation in astigmatism upon zooming.

An optical apparatus according to the first embodiment of the present application comprises the variable magnification optical system having the above described configuration. By such configuration, it is possible to realize a small-size optical apparatus having a high zoom ratio and a high optical performance.

In a method for manufacturing a variable magnification optical system according to the first embodiment of the present application, the variable magnification optical system comprises, in order from an object side: a first lens group having positive refractive power; a second lens group having negative refractive power; a third lens group having positive refractive power; a fourth lens group having positive refractive power; and a fifth lens group having positive refractive power. The method comprises the steps of: arranging the fourth lens group and the fifth lens group to satisfy the undermentioned conditional expressions (1-1) and (1-2); and arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied:

$$7.60 < f5/fw < 45.00 \tag{1-1}$$

$$0.430 < (d4it - d4iw)/f4 < 0.700 \tag{1-2}$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Next, a variable magnification optical system according to the second embodiment of the present application comprises, in order from an object side: a first lens group having positive refractive power; a second lens group having negative refractive power; a third lens group having positive refractive power; a fourth lens group having positive refractive power; and a fifth lens group having positive refractive power; wherein upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group are varied. With this configuration, the variable magnification optical system of the present application can realize zooming from the wide angle end state to the telephoto end state and suppress respective variations in distortion, astigmatism and spherical aberration, associated with the zooming.

Further, with the configuration that the fifth lens group has positive refractive power, a usable magnification of the fifth lens group becomes smaller than an equi-magnification. As a result, it is possible to relatively lengthen a composite focal length of the first to fourth lens groups, so that influence of decentering coma aberration and the like due to eccentricity among the lenses in the first to fourth lens groups caused during manufacturing can be suppressed to be relatively small. Consequently, it is possible to provide a variable magnification optical system having a high optical performance.

Further, in the variable magnification optical system according to the second embodiment of the present application, the following conditional expressions (2-1), (2-2) and (2-3) are satisfied:

$$11.80 < f5/fw < 32.00 \tag{2-1}$$

$$0.170 < f4/f5 < 0.510 \tag{2-2}$$

$$0.065 < (d4it - d4iw)/f5 < 0.300 \tag{2-3}$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

The conditional expression (2-1) defines an adequate range of the focal length of the fifth lens group. With satisfying the conditional expression (2-1), the variable magnification optical system of the present application can suppress variations in astigmatism and distortion upon zooming.

In the variable magnification optical system according to the second embodiment of the present application, when the value of f5/fw is equal to or falls below the lower limit value of the conditional expression (2-1), it becomes difficult to suppress a variation in astigmatism caused in the fifth lens group upon zooming, so that a high optical performance cannot be realized. Further, a lens diameter of the fifth lens group becomes larger. Meanwhile, in order to attain the advantageous effect of the present application more surely, it is more preferable to set the lower limit value of the conditional expression (2-1) to 12.00.

On the other hand, in the variable magnification optical system according to the second embodiment of the present application, when the value of f5/fw is equal to or exceeds the upper limit value of the conditional expression (2-1), it becomes difficult to, in the fifth lens group, suppress variations in astigmatism and distortion caused in the first to fourth lens groups upon zooming, so that a high optical performance cannot be realized. Further, a composite focal length of the first to fourth lens groups becomes shorter and hence influence of decentering coma aberration and the like due to eccentricity among the lenses in the first to fourth lens groups caused during manufacturing becomes larger relatively, so that a high optical performance cannot be realized. Meanwhile, in order to attain the advantageous effect of the present application more surely, it is more preferable to set the upper limit value of the conditional expression (2-1) to 28.00.

The conditional expression (2-2) defines an adequate range of a ratio of the focal length of the fourth lens group to that of the fifth lens group. With satisfying the conditional expression (2-2), the variable magnification optical system according to the second embodiment of the present application can suppress variations in astigmatism and distortion upon zooming.

In the variable magnification optical system according to the second embodiment of the present application, when the value of f4/f5 is equal to or falls below the lower limit value of the conditional expression (2-2), it becomes difficult to, in the fifth lens group, suppress variations in astigmatism and distortion caused in the fourth lens group upon zooming, so that a high optical performance cannot be realized. Meanwhile, in order to attain the advantageous effect of the present application more surely, it is more preferable to set the lower limit value of the conditional expression (2-2) to 0.174.

On the other hand, in the variable magnification optical system according to the second embodiment of the present application, when the value of f4/f5 is equal to or exceeds the upper limit value of the conditional expression (2-2), it becomes difficult to suppress a variation in astigmatism caused in the fifth lens group upon zooming, so that a high optical performance cannot be realized. Meanwhile, in order to attain the advantageous effect of the present application more surely, it is more preferable to set the upper limit value of the conditional expression (2-2) to 0.480.

The conditional expression (2-3) defines an adequate range of a distance from a lens surface on a most image side of the fourth lens group to an image plane upon zooming from the wide-angle end state to the telephoto end state. With satisfying the conditional expression (2-3), the variable magnification optical system according to the second embodiment of the present application can suppress a variation in astigmatism upon zooming.

In the variable magnification optical system according to the second embodiment of the present application, when the value of (d4it−d4iw)/f5 is equal to or falls below the lower limit value of the conditional expression (2-3), a composite focal length of the first to third lens groups becomes shorter relatively and hence it becomes difficult to suppress a variation in astigmatism caused in the first to third lens groups upon zooming, so that a high optical performance cannot be realized. Meanwhile, in order to attain the advantageous effect of the present application more surely, it is more preferable to set the lower limit value of the conditional expression (2-3) to 0.100.

On the other hand, in the variable magnification optical system according to the second embodiment of the present application, when the value of (d4it−d4iw)/f5 is equal to or exceeds the upper limit value of the conditional expression (2-3), it becomes difficult to suppress a variation in astigmatism caused in the fifth lens group upon zooming, so that a high optical performance cannot be realized. Meanwhile, in order to attain the advantageous effect of the present application more surely, it is more preferable to set the higher limit value of the conditional expression (2-3) to 0.270.

With configuring as described above, it is possible to realize a small-size variable magnification optical system having a high zoom ratio and a high optical performance.

Further, in the variable magnification optical system according to the second embodiment of the present application, it is preferable that the following conditional expression (2-4) is satisfied:

$$0.410 < f3/f4 < 1.000 \quad (2\text{-}4)$$

where f3 denotes a focal length of the third lens group, and f4 denotes a focal length of the fourth lens group.

The conditional expression (2-4) defines an adequate range of a ratio of the focal length of the third lens group to that of the fourth lens group. With satisfying the conditional expression (2-4), the variable magnification optical system according to the second embodiment of the present application can suppress variations in spherical aberration and astigmatism upon zooming.

In the variable magnification optical system according to the second embodiment of the present application, when the value of f3/f4 is equal to or falls below the lower limit value of the conditional expression (2-4), it becomes difficult to suppress variations in spherical aberration and astigmatism caused in the third lens group upon zooming, so that a high optical performance cannot be realized. Meanwhile, in order to attain the advantageous effect of the present application more surely, it is more preferable to set the lower limit value of the conditional expression (2-4) to 0.550.

On the other hand, in the variable magnification optical system according to the second embodiment of the present application, when the value of f3/f4 is equal to or exceeds the higher limit value of the conditional expression (2-4), it becomes difficult to suppress variations in spherical aberration and astigmatism caused in the fourth lens group upon zooming, so that a high optical performance cannot be realized. Meanwhile, in order to attain the advantageous effect of the present application more surely, it is more preferable to set the higher limit value of the conditional expression (2-4) to 0.880.

Further, in the variable magnification optical system according to the second embodiment of the present application, it is preferable that the following conditional expression (2-5) is satisfied:

$$-0.050 < (d3t - d3w)/fw < 0.750 \quad (2\text{-}5)$$

where fw denotes a whole system focal length of the variable magnification optical system in the wide-angle end state, d3w denotes a distance on the optical axis from a lens surface on a most image side of the third lens group to a lens surface on a most object side of the fourth lens group in the wide-angle end state, and d3t denotes a distance from the lens surface on the most image side of the third lens group to the lens surface on the most object side of the fourth lens group in the telephoto end state.

The conditional expression (2-5) defines an adequate range of a distance on the optical axis from the lens surface on the most image side of the third lens group to the lens surface on the most object side of the fourth lens group, upon zooming from the wide-angle end state to the telephoto end state. With satisfying the conditional expression (2-5), the variable magnification optical system according to the second embodiment of the present application can suppress variations in coma aberration and astigmatism upon zooming.

In the variable magnification optical system according to the second embodiment of the present application, when the value of (d3t−d3w)/fw is equal to or falls below the lower limit value of the conditional expression (2-5), it becomes difficult to suppress a variation in astigmatism caused in the third lens group upon zooming, so that a high optical performance cannot be realized. Meanwhile, in order to attain the advantageous effect of the present application more surely, it is more preferable to set the lower limit value of the conditional expression (2-5) to 0.000.

On the other hand, in the variable magnification optical system according to the second embodiment of the present application, when the value of (d3t−d3w)/fw is equal to or exceeds the higher limit value of the conditional expression (2-5), it becomes difficult to suppress a variation in coma aberration caused in the fourth lens group upon zooming, so that a high optical performance cannot be realized. Meanwhile, in order to attain the advantageous effect of the present application more surely, it is more preferable to set the higher limit value of the conditional expression (2-5) to 0.500.

Further, in the variable magnification optical system according to the second embodiment of the present application, it is preferable that the first lens group is moved toward the object side upon zooming from the wide-angle end state to the telephoto end state. With this configuration, it is possible to suppress a variation in height from the optical axis of an off-axis beam passing through the first lens group upon zooming. Consequently, it is possible to suppress a variation in astigmatism upon zooming in addition to decrease of a diameter of the first lens group.

Further, in the variable magnification optical system according to the second embodiment of the present application, it is preferable that a distance between the first lens group and the second lens group is increased upon zooming from the wide-angle end state to the telephoto end state. With this configuration, it is possible to make a magnification of the second lens group larger, so that variations in spherical aberration and astigmatism upon zooming can be suppressed while realizing a high zoom ratio effectively.

Further, in the variable magnification optical system according to the second embodiment of the present application, it is preferable that a distance between the second lens group and the third lens group is decreased upon zooming from the wide-angle end state to the telephoto end state. With this configuration, it is possible to make a composite magnification of the third lens group and the fourth lens group larger, so that variations in spherical aberration and astigmatism upon zooming can be suppressed while realizing a high zoom ratio effectively.

Further, in the variable magnification optical system according to the second embodiment of the present application, it is preferable that a distance between the fourth lens group and the fifth lens group is increased upon zooming from the wide-angle end state to the telephoto end state. With this configuration, it is possible to increase a composite magnification of the third lens group and the fourth lens group larger, so that variations in spherical aberration and astigmatism upon zooming can be suppressed while realizing a high zoom ratio effectively.

Further, in the variable magnification optical system according to the second embodiment of the present application, it is preferable that the fifth lens group is fixed in a position upon zooming from the wide-angle end state to the telephoto end state. With this configuration, it is possible to vary a height from the optical axis of marginal light rays made incident on the fifth lens group from the fourth lens group upon zooming and thereby more excellently suppress a variation in astigmatism upon zooming.

An optical apparatus according to the second embodiment of the present application comprises the variable magnification optical system having the above described configuration. By such configuration, it is possible to realize a small-size optical apparatus having a high zoom ratio and a high optical performance.

In a method for manufacturing a variable magnification optical system according to the second embodiment of the present application, the variable magnification optical system comprises, in order from an object side: a first lens group having positive refractive power; a second lens group having negative refractive power; a third lens group having positive refractive power; a fourth lens group having positive refractive power; and a fifth lens group having positive refractive power. The method comprises the steps of: arranging the fourth lens group and the fifth lens group to satisfy the undermentioned conditional expressions (2-1), (2-2) and (2-3); and arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied:

$$11.80 < f5/fw < 32.00 \quad (2\text{-}1)$$

$$0.170 < f4/f5 < 0.510 \quad (2\text{-}2)$$

$$0.065 < (d4it - d4iw)/f5 < 0.300 \quad (2\text{-}3)$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Hereinafter, variable magnification optical systems relating to numerical examples according to the first and second embodiments of the present application will be explained with reference to the accompanying drawings.

FIRST EXAMPLE

FIGS. 1A, 1B, 1C, 1D and 1E are sectional views showing a variable magnification optical system according to the First Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the object side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively.

To be specific, the first lens group G1, the third lens group G3 and the fourth lens group G4 are moved toward the object side upon zooming. The second lens group G2 is moved toward the object side from the wide-angle end state to the third intermediate focal length state and it is moved toward the image side from the third intermediate focal length state to the telephoto end state. The fifth lens group G5 is fixed in a position in the direction of the optical axis upon zooming. Meanwhile, the aperture stop S is moved integrally with the fourth lens group G4 upon zooming.

Consequently, upon zooming, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is increased from the wide-angle end state to the first intermediate focal length state, it is decreased from the first intermediate focal length state to the second intermediate focal length state, and it is increased from the second intermediate focal length state to the telephoto end state. Meanwhile, upon zooming, a distance between the aperture stop S and the third lens group G3 is decreased from the wide-angle end state to the first intermediate focal length state, it is increased from the first intermediate focal length state to the second intermediate focal length state, and it is decreased from the second intermediate focal length state to the telephoto end state.

Table 1 below shows various values of the variable magnification optical system according to the present Example.

In Table 1, f denotes a focal length, and BF denotes a back focal length (a distance on the optical axis between the most image side lens surface and an image plane I).

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and νd denotes an Abbe number for d-line (wavelength λ=587.6 nm). Further, OP denotes an object surface, S denotes an aperture stop, and I denotes an image plane. Meanwhile, a radius of curvature r=∞ denotes a plane surface. As for an aspherical surface, "*" is attached to the surface number and a value of a paraxial radius of curvature is indicated in the column of the radius of curvature r. Refractive index of air nd=1.000000 is omitted in the description.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+[1-\kappa(h/r)^2]^{1/2}]+A4h^4+A6h^6+A8h^8+A10h^{10}+A12h^{12}$$

where h denotes a vertical height from the optical axis, x denotes a distance in the direction of the optical axis from a tangent surface at a vertex of the aspherical surface to the aspherical surface at the vertical height from the optical axis (a sag amount), κ denotes a conical coefficient, A4, A6, A8, A10 and A12 denote respective aspherical coefficients, and r denotes a radius of curvature of a reference sphere (a paraxial radius of curvature). "E-n", where n is an integer, denotes "×10$^{-n}$", for example, "1.234E-05" denotes "1.234× 10$^{-5}$". The 2nd order aspherical surface coefficient A2 is 0, and omitted in the description.

In [Various Data], FNO denotes an F-number, ω denotes a half angle of view (unit "°"), Y denotes an image height, TL denotes a total length of the variable magnification optical system (a distance on the optical axis from the first surface to the image plane I upon focusing on the infinite distance object), dο denotes a variable interval between an n-th surface and an (n+1)-th surface and φ denotes a diameter of the aperture stop S. Meanwhile, W denotes the wide-angle end state, M1 denotes the first intermediate focal length state, M2 denotes the second intermediate focal length state, M3 denotes the third intermediate focal length state, and T denotes the telephoto end state.

In [Lens Group Data], a starting surface ST and a focal length f are shown for each lens group.

In [Values for Conditional Expressions], values corresponding to respective conditional expressions in the variable magnification optical system according to the present Example are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

The above-mentioned reference symbols in Table 1 are also employed in the same manner in Tables of the after-mentioned Examples.

TABLE 1

First Example

[Surface Data]

| m | r | d | nd | νd |
|---|---|---|---|---|
| OP | ∞ | | | |
| 1 | 165.4019 | 1.6350 | 1.902650 | 35.73 |
| 2 | 41.8893 | 9.2560 | 1.497820 | 82.57 |
| 3 | −178.4364 | 0.1000 | | |

TABLE 1-continued

First Example

| | | | | |
|---|---|---|---|---|
| 4 | 42.8430 | 5.1140 | 1.729160 | 54.61 |
| 5 | 515.0653 | d5 | | |
| *6 | 500.0000 | 1.0000 | 1.851350 | 40.10 |
| 7 | 9.0059 | 4.2479 | | |
| 8 | −16.6413 | 1.0000 | 1.883000 | 40.66 |
| 9 | 50.8442 | 0.7538 | | |
| 10 | 32.1419 | 3.0566 | 1.808090 | 22.74 |
| 11 | −18.1056 | 1.0000 | 1.883000 | 40.66 |
| 12 | −29.3627 | d12 | | |
| 13 | ∞ | d13 | | Aperture Stop S |
| 14 | 27.1583 | 1.0000 | 1.883000 | 40.66 |
| 15 | 14.3033 | 3.4259 | 1.593190 | 67.90 |
| 16 | −43.0421 | d16 | | |
| 17 | 12.5000 | 8.2427 | 1.670030 | 47.14 |
| 18 | −79.2339 | 1.0000 | 1.883000 | 40.66 |
| 19 | 11.4345 | 2.0000 | | |
| 20 | 18.9834 | 3.3397 | 1.518600 | 69.89 |
| 21 | −12.4126 | 1.0000 | 1.850260 | 32.35 |
| 22 | −22.7118 | 1.5000 | | |
| 23 | −46.2616 | 1.0000 | 1.902650 | 35.73 |
| 24 | 11.4391 | 3.5033 | 1.581440 | 40.98 |
| 25 | −30.7870 | 0.1000 | | |
| 26 | 28.7953 | 5.0986 | 1.581440 | 40.98 |
| 27 | −8.8012 | 1.0000 | 1.820800 | 42.71 |
| *28 | −35.2149 | d28 | | |
| 29 | −40.0000 | 1.6432 | 1.497820 | 82.57 |
| 30 | −19.4318 | 1.0000 | 1.834410 | 37.28 |
| *31 | −22.7996 | BF | | |
| I | ∞ | | | |

[Aspherical Data]

| | |
|---|---|
| m | 6 |
| κ | 11.00000 |
| A4 | 3.95289E−05 |
| A6 | −2.04622E−07 |
| A8 | −4.81392E−09 |
| A10 | 9.83575E−11 |
| A12 | −5.88880E−13 |
| m | 28 |
| κ | 1.0000 |
| A4 | −5.59168E−05 |
| A6 | −2.20298E−07 |
| A8 | 3.87818E−10 |
| A10 | 1.16318E−11 |
| A12 | 0.00000 |
| m | 31 |
| κ | 1.00000 |
| A4 | 2.65930E−05 |
| A6 | 7.69228E−08 |
| A8 | −1.34346E−09 |
| A10 | 0.00000 |
| A12 | 0.00000 |

[Various Data]
zoom ratio 14.14

| | W | | T |
|---|---|---|---|
| f | 9.47 | ~ | 133.87 |
| FNO | 4.12 | ~ | 5.78 |
| ω | 41.95 | ~ | 3.27° |
| Y | 8.00 | | 8.00 |
| TL | 112.25 | ~ | 165.65 |

| | W | M1 | M2 | M3 | T |
|---|---|---|---|---|---|
| f | 9.47002 | 17.83631 | 60.50026 | 90.50043 | 133.87072 |
| ω | 41.95497 | 23.18274 | 7.18201 | 4.82759 | 3.26779 |
| FNO | 4.12 | 5.24 | 5.77 | 5.77 | 5.78 |
| φ | 8.52 | 8.52 | 9.55 | 10.30 | 11.04 |
| d5 | 2.10000 | 12.15693 | 36.10717 | 41.77210 | 46.27797 |
| d12 | 24.77744 | 16.39929 | 5.66327 | 3.74451 | 2.20000 |
| d13 | 5.18928 | 3.23115 | 4.53928 | 3.63928 | 1.80000 |
| d16 | 2.25000 | 4.20813 | 2.90000 | 3.80000 | 5.63928 |
| d28 | 1.86861 | 12.02032 | 28.59900 | 32.29005 | 33.66620 |
| BF | 14.04947 | 14.04956 | 14.04989 | 14.04993 | 14.05005 |

TABLE 1-continued

First Example

[Lens Group Data]

| | ST | f |
|---|---|---|
| G1 | 1 | 68.08250 |
| G2 | 6 | −9.98760 |
| G3 | 14 | 38.80284 |
| G4 | 17 | 60.78065 |
| G5 | 29 | 129.99998 |

[Values for Conditional Expressions]

| | |
|---|---|
| (1-1) | f5/fw = 13.73 |
| (1-2) | (d4iT − d4iW)/f4 = 0.523 |
| (1-3) | f3/f4 = 0.638 |
| (1-4) | (d3T − d3W)/fw = 0.358 |
| (2-1) | f5/fw = 13.73 |
| (2-2) | f4/f5 = 0.468 |
| (2-3) | (d4iT − d4iw)/f5 = 0.245 |
| (2-4) | f3/f4 = 0.638 |
| (2-5) | (d3T − d3W)/fw = 0.358 |

Figure 2B:
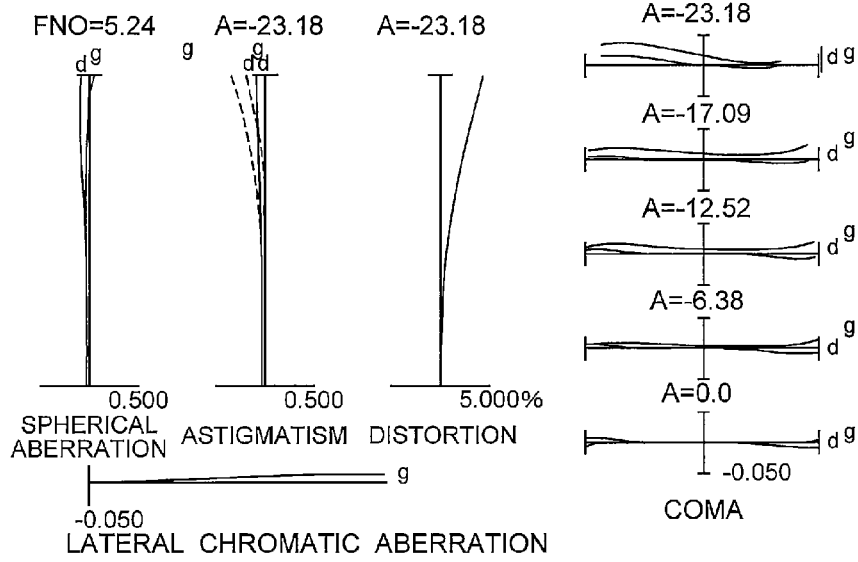
Figure 2C:
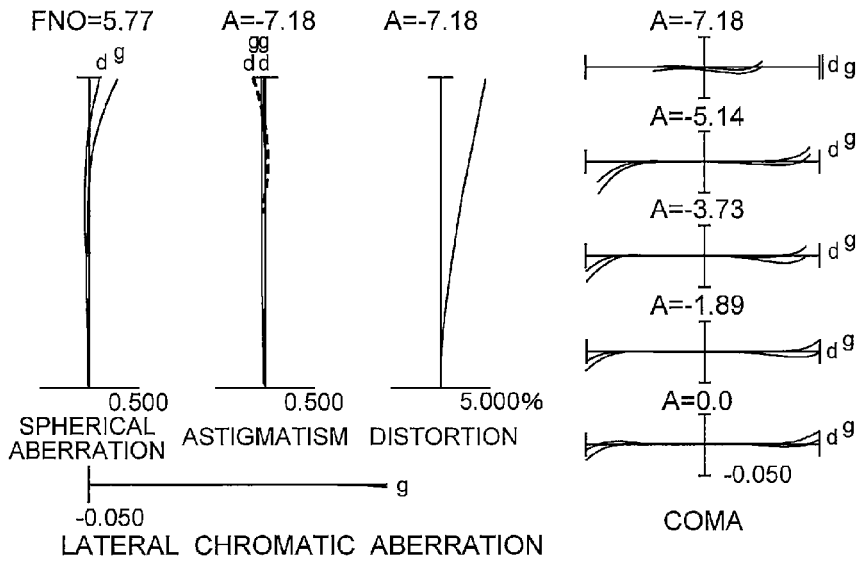

FIGS. 2A, 2B and 2C are graphs showing various aberrations of the variable magnification optical system according to the First Example of the first and second embodiments of the present application upon focusing on an infinite distance object, in the wide-angle end state, in the first intermediate focal length state, and in the second intermediate focal length state, respectively.

Figure 3A:
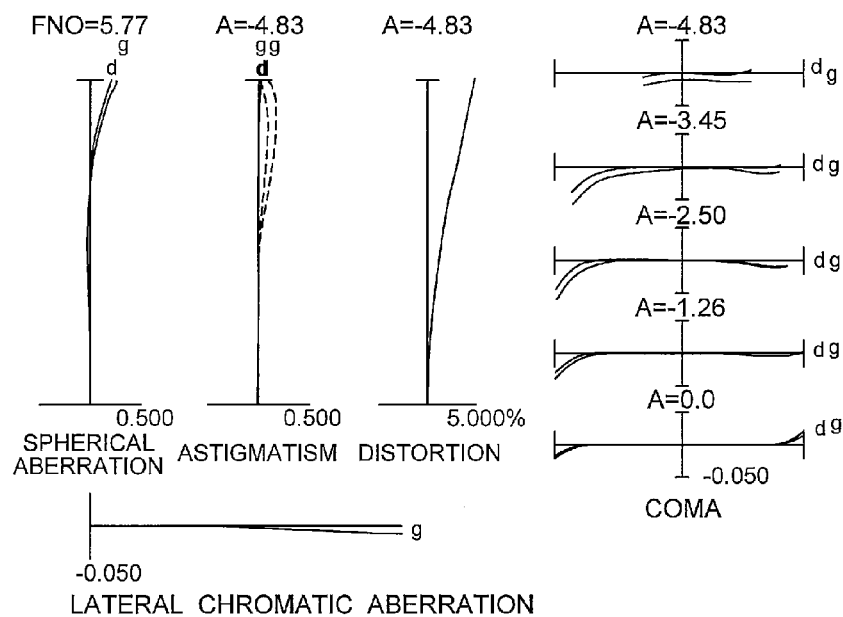
FIGS. 3A and 3B are graphs showing various aberrations of the variable magnification optical system according to the First Example of the first and second embodiments of the present application upon focusing on the infinite distance object, in the third intermediate focal length state and in the telephoto end state, respectively.
Figure 3B:
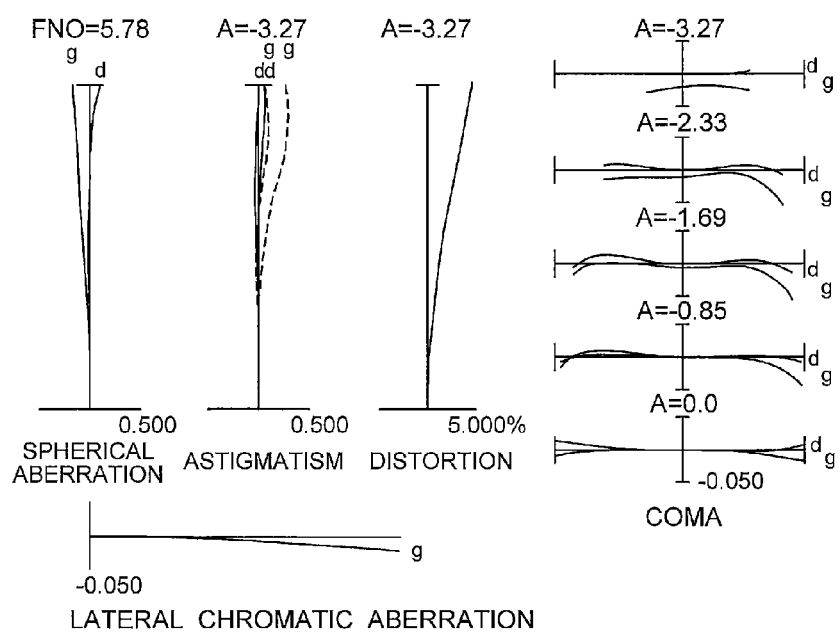
Figure 4A:
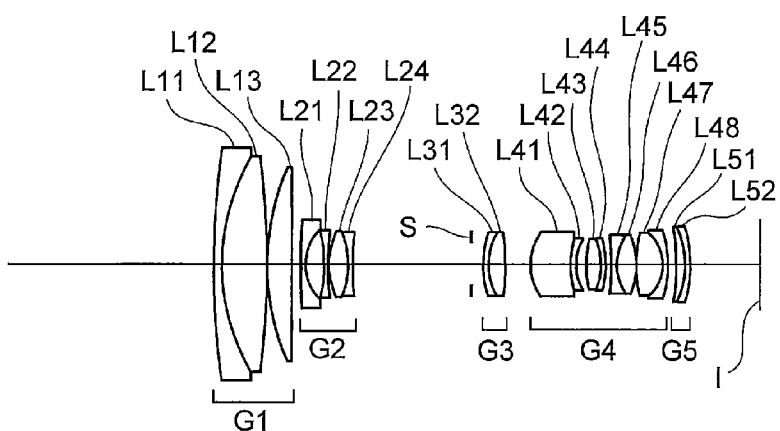
FIGS. 4A, 4B, 4C, 4D and 4E are sectional views showing a variable magnification optical system according to a Second Example of the first and second embodiments of the present application, in a wide-angle end state, in a first intermediate focal length state, in a second intermediate focal length state, in a third intermediate focal length state and in a telephoto end state, respectively.
Figure 4B:
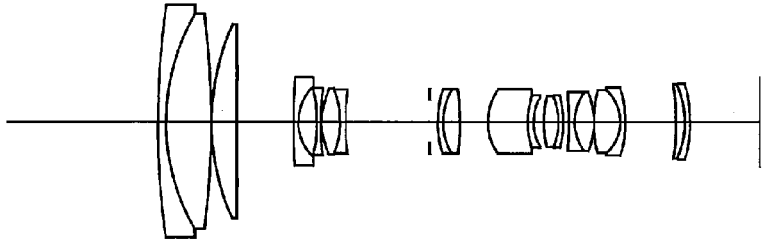
Figure 4C:
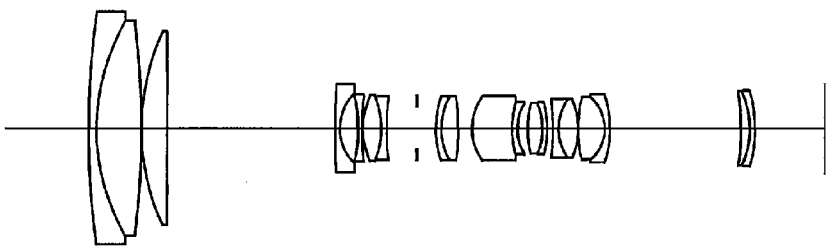
Figure 4D:
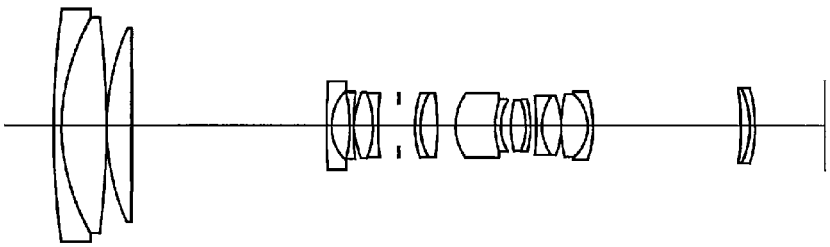
Figure 4E:
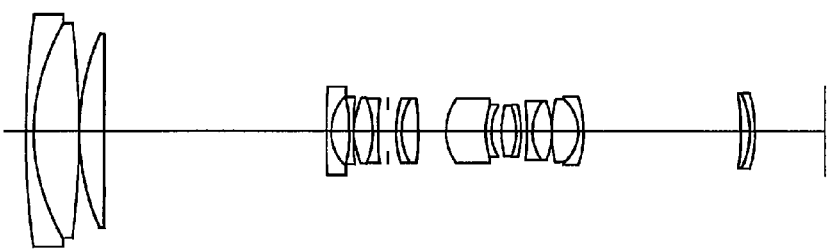

FIGS. 3A and 3B are graphs showing various aberrations of the variable magnification optical system according to the First Example of the first and second embodiments of the present application upon focusing on the infinite distance object, in the third intermediate focal length state and in the telephoto end state, respectively.

In respective graphs, FNO denotes an F-number, A denotes an incident angle of a light ray, that is, a half angle of view (unit "°"). d denotes an aberration curve at d-line (wavelength λ=587.6 nm), g denotes an aberration curve at g-line (wavelength λ=435.8 nm), and when neither d nor g is mentioned, a curve indicates an aberration at the d-line. In the graph showing astigmatism, a solid line indicates a sagittal image plane, and a broken line indicates a meridional image plane. Incidentally, the above-mentioned symbols in the present Example are also employed in the same manner in the graphs of the after-mentioned Examples.

As is apparent from the respective graphs, the variable magnification optical system according to the present Example shows good corrections to various aberrations from the wide-angle end state to the telephoto end state, and also shows a high optical performance.

SECOND EXAMPLE

FIGS. 4A, 4B, 4C, 4D and 4E are sectional views showing a variable magnification optical system according to the Second Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively.

To be specific, the first lens group G1, the third lens group G3 and the fourth lens group G4 are moved toward the object side upon zooming. The second lens group G2 is moved toward the object side from the wide-angle end state to the third intermediate focal length state and it is moved toward the image side from the third intermediate focal length state to the telephoto end state. The fifth lens group G5 is fixed in a position in the direction of the optical axis upon zooming. Meanwhile, the aperture stop S is moved toward the object side integrally with the fourth lens group G4 upon zooming.

Consequently, upon zooming, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is increased from the wide-angle end state to the first intermediate focal length state, it is decreased from the first intermediate focal length state to the second intermediate focal length state, and it is increased from the second intermediate focal length state to the telephoto end state. Meanwhile, upon zooming, a distance between the aperture stop S and the third lens group G3 is decreased from the wide-angle end state to the first intermediate focal length state, it is increased from the first intermediate focal length state to the second intermediate focal length state, and it is decreased from the second intermediate focal length state to the telephoto end state.

Table 2 below shows various values of the variable magnification optical system according to the present Example.

TABLE 2

Second Example

[Surface Data]

| m | r | d | nd | vd |
|---|---|---|---|---|
| OP | ∞ | | | |
| 1 | 149.1393 | 1.6350 | 1.902650 | 35.73 |
| 2 | 39.3210 | 9.1912 | 1.497820 | 82.57 |
| 3 | −200.0000 | 0.1000 | | |
| 4 | 41.9637 | 5.4484 | 1.729160 | 54.61 |
| 5 | 1039.4250 | d5 | | |
| *6 | 500.0000 | 1.0000 | 1.851350 | 40.10 |
| 7 | 9.7424 | 3.8435 | | |
| 8 | −27.3991 | 1.0000 | 1.883000 | 40.66 |
| 9 | 89.0051 | 0.2895 | | |
| 10 | 21.6984 | 3.7554 | 1.808090 | 22.74 |
| 11 | −15.0205 | 1.0000 | 1.883000 | 40.66 |
| 12 | 103.6128 | d12 | | |
| 13 | ∞ | d13 | | Aperture Stop S |
| 14 | 26.3876 | 1.0000 | 1.883000 | 40.66 |
| 15 | 13.2001 | 3.5030 | 1.593190 | 67.90 |
| 16 | −39.4805 | d16 | | |
| 17 | 12.5000 | 8.2088 | 1.743200 | 49.26 |
| 18 | 25.6321 | 1.0000 | 1.834000 | 37.18 |
| 19 | 9.6066 | 2.0000 | | |
| 20 | 17.4828 | 3.0696 | 1.516800 | 63.88 |
| 21 | −13.7429 | 1.0000 | 1.850260 | 32.35 |
| 22 | −25.6259 | 1.5000 | | |
| 23 | −19.7745 | 1.0000 | 1.850260 | 32.35 |
| 24 | 12.4270 | 3.9453 | 1.620040 | 36.40 |
| 25 | −17.2177 | 0.3559 | | |
| 26 | 44.5160 | 5.3272 | 1.581440 | 40.98 |
| 27 | −8.1562 | 1.0000 | 1.820800 | 42.71 |
| *28 | −28.1926 | d28 | | |
| 29 | −40.0000 | 1.7646 | 1.497820 | 82.57 |
| 30 | −18.8409 | 1.0000 | 1.834410 | 37.28 |
| *31 | −25.0038 | BF | | |
| I | ∞ | | | |

[Aspherical Data]

| m | 6 |
|---|---|
| κ | 10.29120 |
| A4 | 1.05982E−05 |
| A6 | 1.47868E−07 |
| A8 | −6.64708E−09 |
| A10 | 8.77431E−11 |
| A12 | −4.23990E−13 |
| m | 28 |
| κ | 1.0000 |
| A4 | −7.26393E−05 |

TABLE 2-continued

Second Example

| | | |
|---|---|---|
| A6 | | -3.38257E-07 |
| A8 | | 1.26743E-09 |
| A10 | | -2.83030E-11 |
| A12 | | 0.00000 |
| m | | 31 |
| κ | | 1.00000 |
| A4 | | 2.68564E-05 |
| A6 | | 7.91224E-08 |
| A8 | | -8.06538E-10 |
| A10 | | 0.00000 |
| A12 | | 0.00000 |

[Various Data]
zoom ratio 14.13

| | W | T |
|---|---|---|
| f | 10.30 | ~ 145.50 |
| FNO | 4.08 | ~ 5.71 |
| ω | 39.62 | ~ 3.01° |
| Y | 8.00 | ~ 8.00 |
| TL | 112.60 | ~ 162.60 |

| | W | M1 | M2 | M3 | T |
|---|---|---|---|---|---|
| f | 10.30001 | 18.00395 | 60.55030 | 89.50052 | 145.50102 |
| ω | 39.61866 | 23.08393 | 7.20247 | 4.88583 | 3.00545 |
| FNO | 4.08 | 4.79 | 5.49 | 5.75 | 5.72 |
| φ | 9.01 | 9.02 | 9.02 | 9.26 | 10.08 |
| d5 | 2.10000 | 11.86757 | 33.84673 | 38.94667 | 43.98780 |
| d12 | 24.38938 | 17.21960 | 5.86923 | 4.42463 | 2.20000 |
| d13 | 2.46923 | 1.80000 | 4.59702 | 3.69702 | 1.80000 |
| d16 | 5.02779 | 5.69702 | 2.90000 | 3.80000 | 5.69702 |
| d28 | 1.62642 | 10.35671 | 26.30176 | 30.05048 | 31.92800 |
| BF | 14.04946 | 14.04953 | 14.04979 | 14.04990 | 14.05006 |

[Lens Group Data]

| | ST | f |
|---|---|---|
| G1 | 1 | 64.91265 |
| G2 | 6 | -9.00339 |
| G3 | 14 | 38.07719 |
| G4 | 17 | 46.69911 |
| G5 | 29 | 260.10501 |

[Values for Conditional Expressions]

| | |
|---|---|
| (1-1) | f5/fw = 25.25 |
| (1-2) | (d4iT − d4iW)/f4 = 0.649 |
| (1-3) | f3/f4 = 0.815 |
| (1-4) | (d3T − d3W)/fw = 0.065 |
| (2-1) | f5/fw = 25.25 |
| (2-2) | f4/f5 = 0.180 |
| (2-3) | (d4iT − d4iw)/f5 = 0.117 |
| (2-4) | f3/f4 = 0.815 |
| (2-5) | (d3T − d3W)/fw = 0.065 |

Figure 5A:
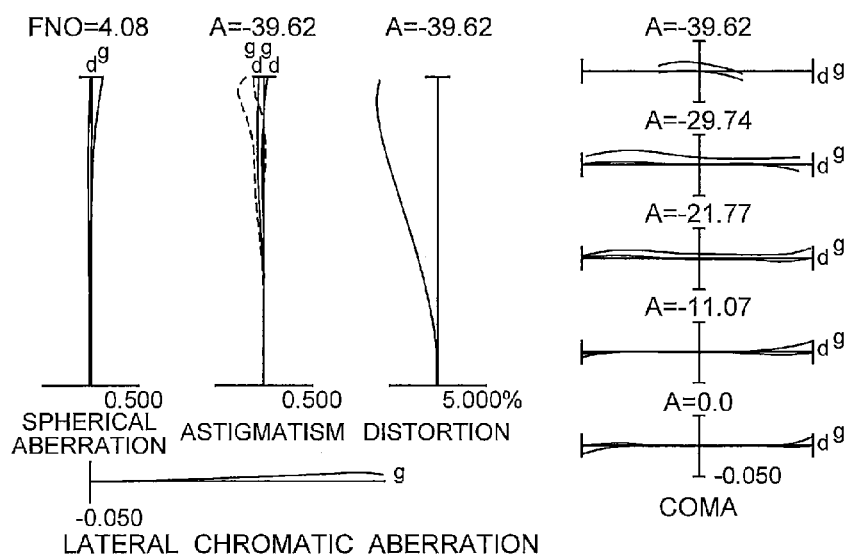
FIGS. 5A, 5B and 5C are graphs showing various aberrations of the variable magnification optical system according to the Second Example of the first and second embodiments of the present application upon focusing on an infinite distance object, in the wide-angle end state, in the first intermediate focal length state, and in the second intermediate focal length state, respectively.
Figure 5B:
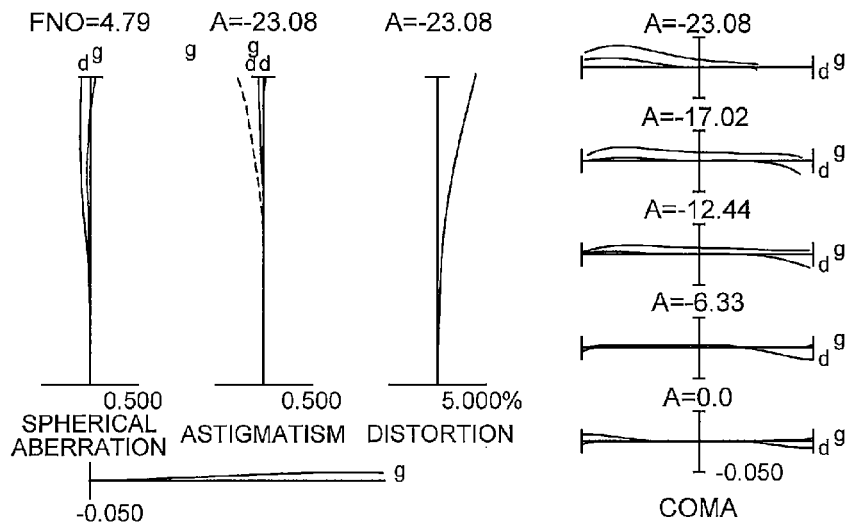
Figure 5C:
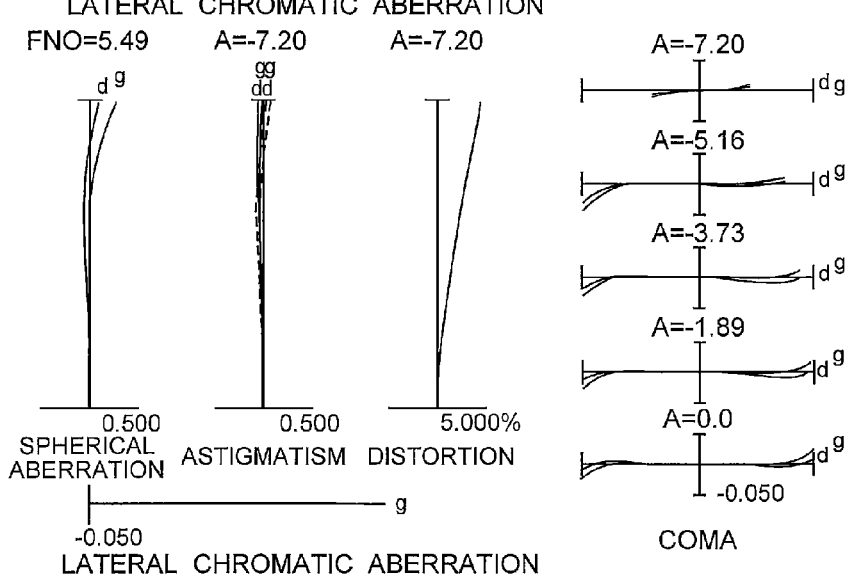

FIGS. 5A, 5B and 5C are graphs showing various aberrations of the variable magnification optical system according to the Second Example of the first and second embodiments of the present application upon focusing on an infinite distance object, in the wide-angle end state, in the first intermediate focal length state, and in the second intermediate focal length state, respectively.

Figure 6A:
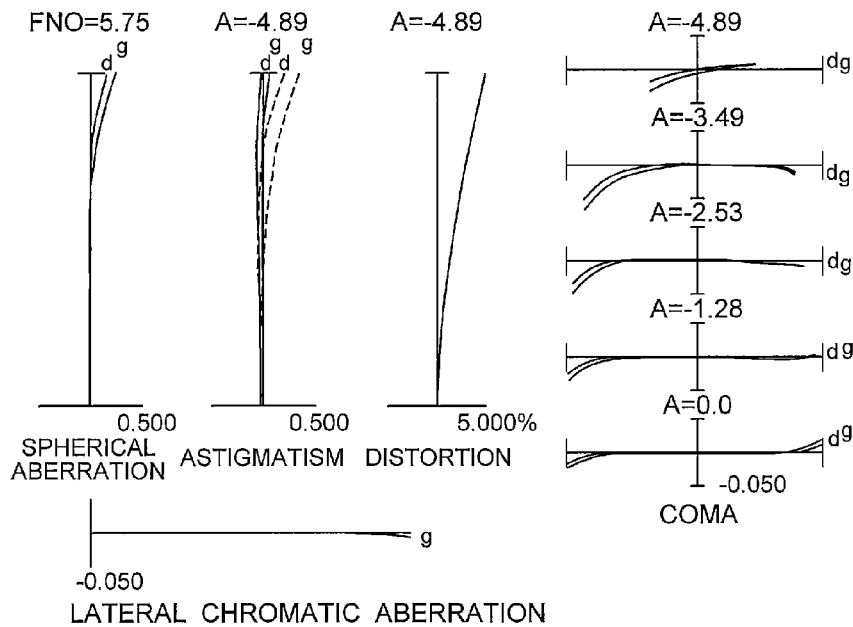
FIGS. 6A and 6B are graphs showing various aberrations of the variable magnification optical system according to the Second Example of the first and second embodiments of the present application upon focusing on the infinite distance object, in the third intermediate focal length state and in the telephoto end state, respectively.
Figure 6B:
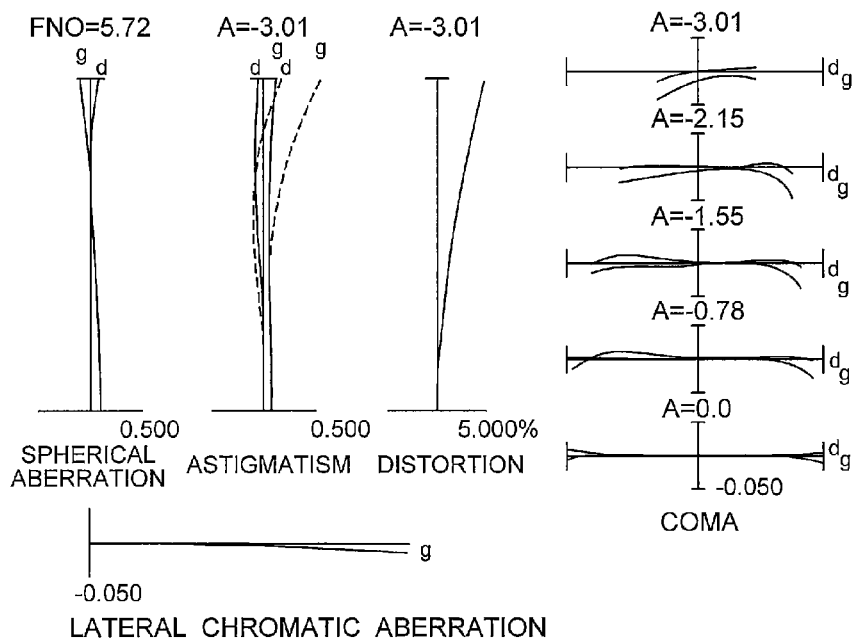
Figure 7A:
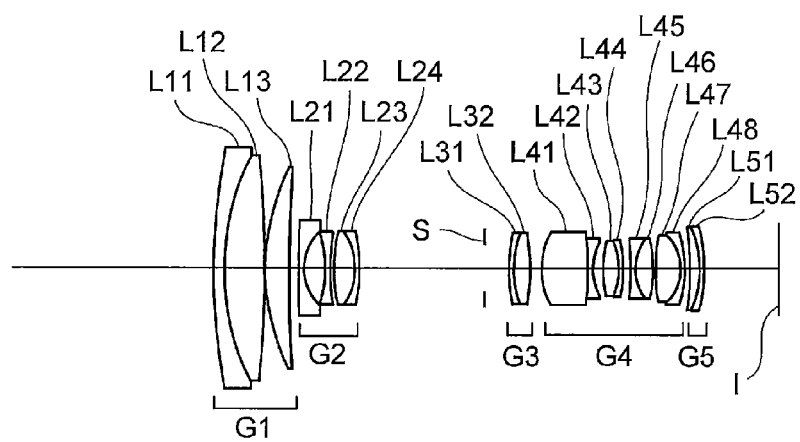
FIGS. 7A, 7B, 7C, 7D and 7E are sectional views showing a variable magnification optical system according to a Third Example of the first and second embodiments of the present application, in a wide-angle end state, in a first intermediate focal length state, in a second intermediate focal length state, in a third intermediate focal length state and in a telephoto end state, respectively.
Figure 7B:
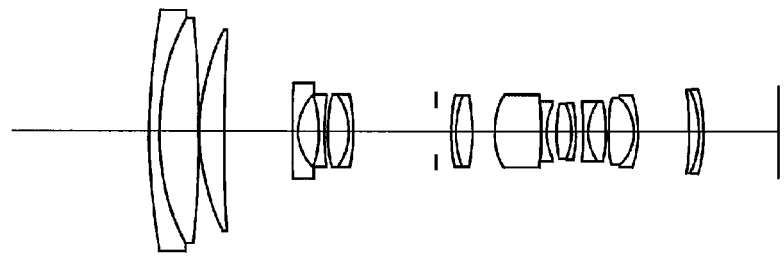
Figure 7C:
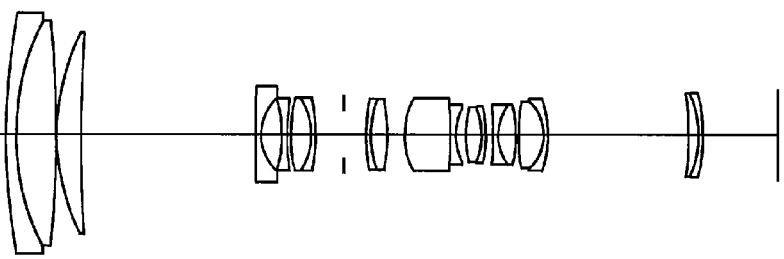
Figure 7D:
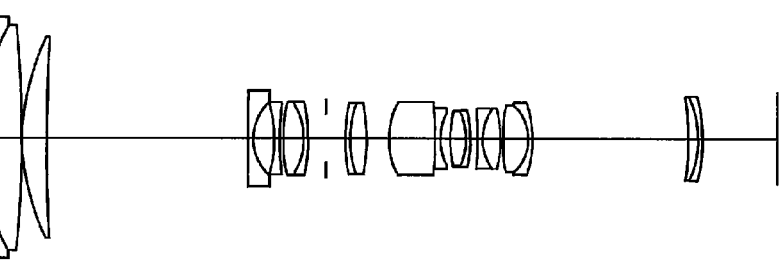
Figure 7E:
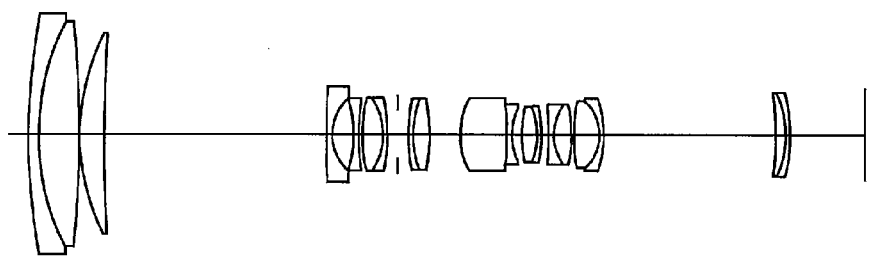

FIGS. 6A and 6B are graphs showing various aberrations of the variable magnification optical system according to the Second Example of the first and second embodiments of the present application upon focusing on the infinite distance object, in the third intermediate focal length state and in the telephoto end state, respectively.

As is apparent from the respective graphs, the variable magnification optical system according to the present Example shows excellent corrections to various aberrations from the wide-angle end state through the telephoto end state, and also shows a high optical performance.

THIRD EXAMPLE

FIGS. 7A, 7B, 7C, 7D and 7E are sectional views showing a variable magnification optical system according to the Third Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a negative meniscus lens L24 having a concave surface facing the object side. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the object side, a cemented lens constructed by a double convex positive lens L41 cemented with a double concave negative lens L42, a cemented lens constructed by a double convex positive lens L43 cemented with a negative meniscus lens L44 having a concave surface facing the object side, a cemented lens constructed by a double concave negative lens L45 cemented with a double convex positive lens L46, and a cemented lens constructed by a double convex positive lens L47 cemented with a negative meniscus lens L48 having a concave surface facing the object side. Meanwhile, the negative meniscus lens L48 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively. The fifth lens group G5 is fixed in a position in the direction of the optical axis upon zooming. Meanwhile, the aperture stop S is moved toward the object side integrally with the fourth lens group G4 upon zooming.

To be specific, upon zooming, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is increased from the wide-angle end state to the first intermediate focal length state, it is decreased from the first intermediate focal length state to the second intermediate focal length state, and it is increased from the second intermediate focal length state to the telephoto end state. Meanwhile, upon zooming, a distance between the aperture stop S and the third lens group G3 is decreased from the wide-angle end state to the first intermediate focal length state, it is increased from the first intermediate focal length state to the second intermediate focal length state, and it is decreased from the second intermediate focal length state to the telephoto end state.

Table 3 below shows various values of the variable magnification optical system according to the present Example.

TABLE 3

Third Example

[Surface Data]

| m | r | d | nd | νd |
|---|---|---|---|---|
| OP | ∞ | | | |
| 1 | 142.4935 | 1.6350 | 1.950000 | 29.37 |
| 2 | 42.2502 | 8.5971 | 1.497820 | 82.57 |
| 3 | −244.5599 | 0.1000 | | |
| 4 | 43.5280 | 4.7901 | 1.834810 | 42.73 |
| 5 | 290.5464 | d5 | | |
| *6 | 500.0000 | 1.0000 | 1.851350 | 40.10 |
| 7 | 9.0471 | 4.3168 | | |
| 8 | −20.3544 | 1.0000 | 1.903660 | 31.27 |
| 9 | 42.4575 | 0.7313 | | |
| 10 | 28.0881 | 4.0634 | 1.808090 | 22.74 |
| 11 | −12.5975 | 1.0000 | 1.883000 | 40.66 |
| 12 | −38.6924 | d12 | | |
| 13 | ∞ | d13 | | Aperture Stop S |
| 14 | 31.6163 | 1.0000 | 1.883000 | 40.66 |
| 15 | 15.7262 | 3.3464 | 1.593190 | 67.90 |
| 16 | −39.3012 | d16 | | |
| 17 | 13.5000 | 9.6782 | 1.717000 | 47.98 |
| 18 | −38.7323 | 1.0000 | 1.883000 | 40.66 |
| 19 | 11.8099 | 2.0000 | | |
| 20 | 19.9976 | 3.2554 | 1.516800 | 63.88 |
| 21 | −12.0110 | 1.0000 | 1.850260 | 32.35 |
| 22 | −20.9691 | 1.5000 | | |
| 23 | −39.8308 | 1.0000 | 1.950000 | 29.37 |
| 24 | 10.4776 | 3.5701 | 1.672700 | 32.19 |
| 25 | −30.1182 | 0.5349 | | |
| 26 | 36.6513 | 5.1773 | 1.581440 | 40.98 |
| 27 | −8.5118 | 1.0000 | 1.820800 | 42.71 |
| *28 | −28.2741 | d28 | | |
| 29 | −40.0000 | 1.9141 | 1.497820 | 82.57 |
| 30 | −18.1052 | 1.0000 | 1.834410 | 37.28 |
| *31 | −22.6207 | BF | | |
| I | ∞ | | | |

TABLE 3-continued

Third Example

[Aspherical Data]

| m | 6 |
|---|---|
| κ | −3.81950 |
| A4 | 4.21558E−05 |
| A6 | −2.17082E−07 |
| A8 | −2.45102E−09 |
| A10 | 5.51411E−11 |
| A12 | −2.85950E−13 |
| m | 28 |
| κ | 1.0000 |
| A4 | −6.70317E−05 |
| A6 | −2.82990E−07 |
| A8 | 5.39592E−10 |
| A10 | −1.47007E−11 |
| A12 | 0.00000 |
| m | 31 |
| κ | 1.00000 |
| A4 | 2.67692E−05 |
| A6 | 2.52197E−08 |
| A8 | −6.04092E−10 |
| A10 | 0.00000 |
| A12 | 0.00000 |

[Various Data]
zoom ratio 14.13

| | W | | T |
|---|---|---|---|
| f | 9.27 | ~ | 130.95 |
| FNO | 4.11 | ~ | 5.71 |
| ω | 42.66 | ~ | 3.37° |
| Y | 8.00 | ~ | 8.00 |
| TL | 113.35 | ~ | 167.85 |

| | W | M1 | M2 | M3 | T |
|---|---|---|---|---|---|
| f | 9.27001 | 17.98649 | 60.50024 | 89.50040 | 130.95047 |
| ω | 42.66459 | 22.98882 | 7.25983 | 4.93130 | 3.37079 |
| FNO | 4.11 | 5.12 | 5.73 | 5.75 | 5.71 |
| φ | 8.59 | 8.59 | 9.57 | 10.18 | 11.03 |
| d5 | 2.10000 | 14.22823 | 35.96983 | 41.57489 | 45.70436 |
| d12 | 24.57776 | 16.27840 | 5.38702 | 3.71762 | 2.20000 |
| d13 | 5.01075 | 3.17327 | 4.36075 | 3.46075 | 1.80000 |
| d16 | 2.25000 | 4.08748 | 2.90000 | 3.80000 | 5.46075 |
| d28 | 1.15583 | 11.01481 | 29.01229 | 32.10086 | 34.42483 |
| BF | 14.04945 | 14.04946 | 14.04979 | 14.04987 | 14.04999 |

[Lens Group Data]

| | ST | f |
|---|---|---|
| G1 | 1 | 67.49208 |
| G2 | 6 | −9.52181 |
| G3 | 14 | 41.09622 |
| G4 | 17 | 53.39457 |
| G5 | 29 | 147.67270 |

[Values for Conditional Expression]

| (1-1) | f5/fw = 15.93 |
| (1-2) | (d4iT − d4iW)/f4 = 0.623 |
| (1-3) | f3/f4 = 0.770 |
| (1-4) | (d3T − d3W)/fw = 0.346 |
| (2-1) | f5/fw = 15.93 |
| (2-2) | f4/f5 = 0.362 |
| (2-3) | (d4iT − d4iw)/f5 = 0.225 |
| (2-4) | f3/f4 = 0.770 |
| (2-5) | (d3T − d3W)/fw = 0.346 |

Figure 8A:
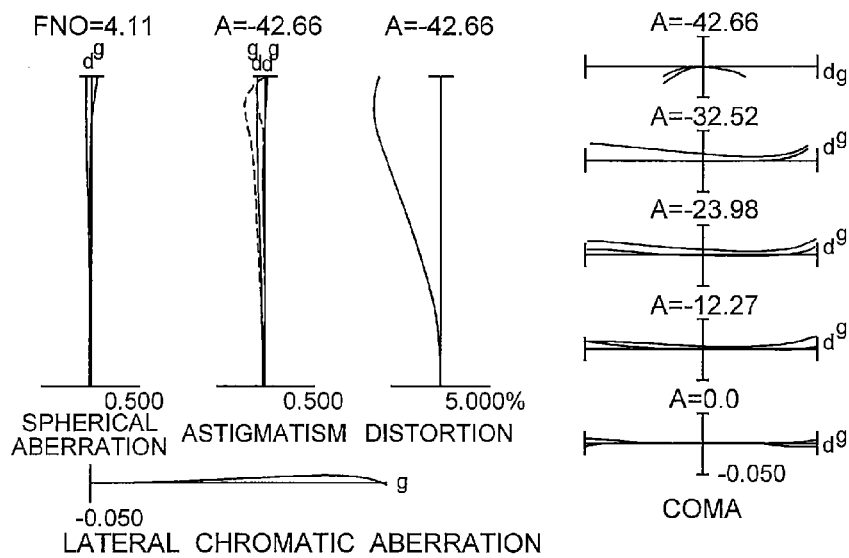
FIGS. 8A, 8B and 8C are graphs showing various aberrations of the variable magnification optical system according to the Third Example of the first and second embodiments of the present application upon focusing on an infinite distance object, in the wide-angle end state, in the first intermediate focal length state, and in the second intermediate focal length state, respectively.
Figure 8B:
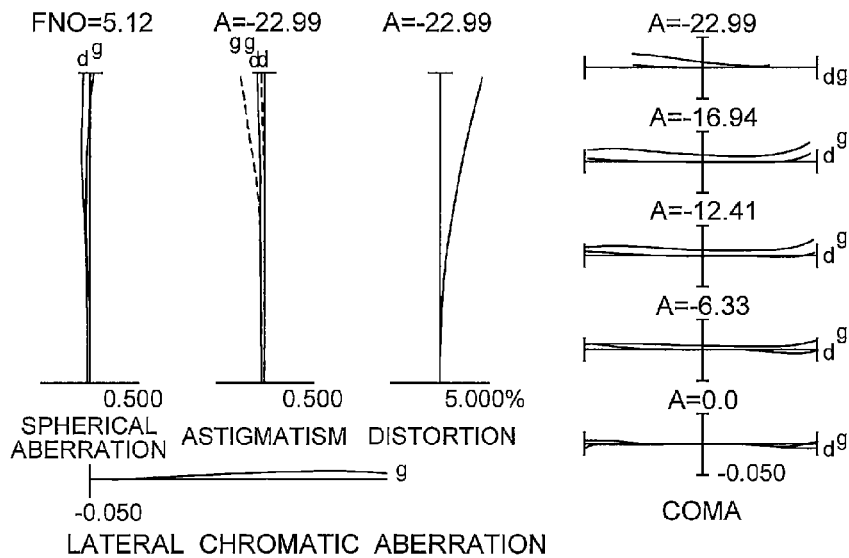
Figure 8C:
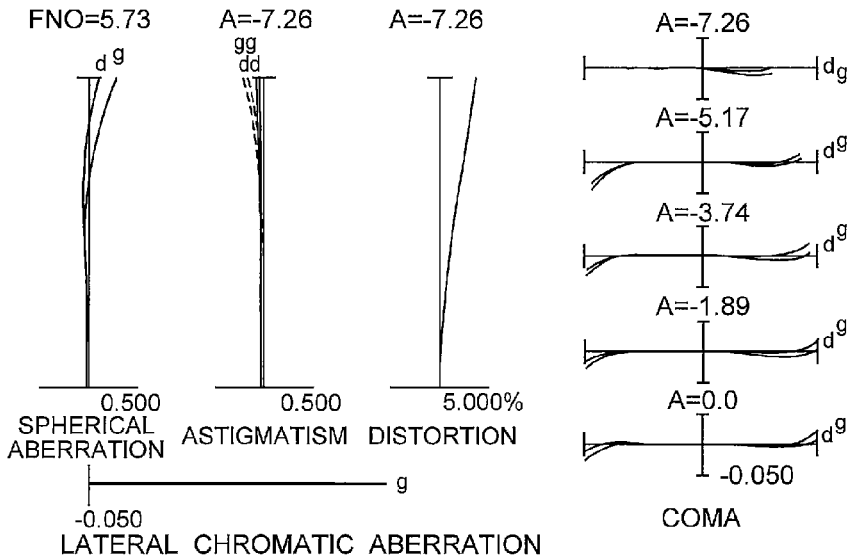

FIGS. 8A, 8B and 8C are graphs showing various aberrations of the variable magnification optical system according to the Third Example of the first and second embodiments of the present application upon focusing on an infinite distance object, in the wide-angle end state, in the first intermediate focal length state, and in the second intermediate focal length state, respectively.

Figure 9A:
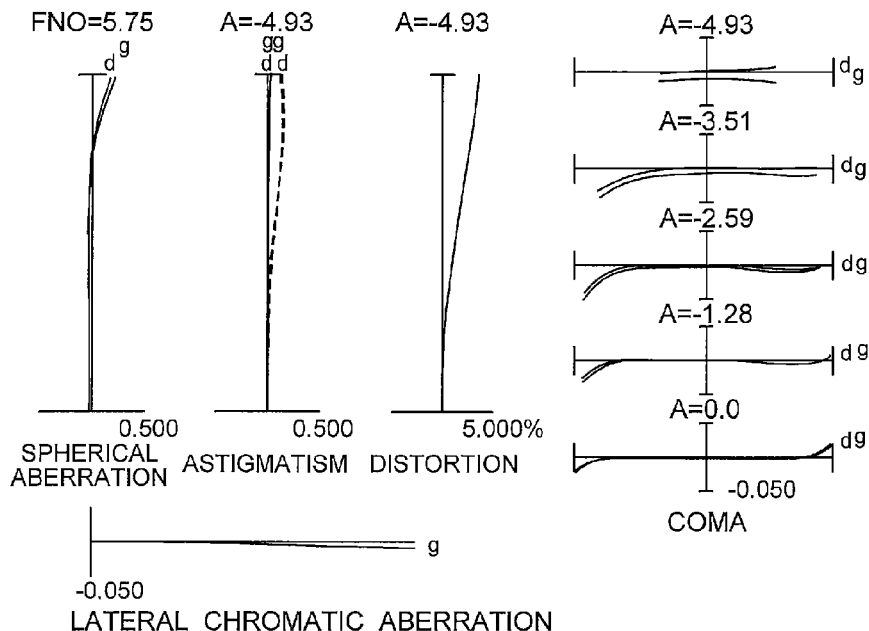
FIGS. 9A and 9B are graphs showing various aberrations of the variable magnification optical system according to the Third Example of the first and second embodiments of the present application upon focusing on the infinite distance object, in the third intermediate focal length state and in the telephoto end state, respectively.
Figure 9B:
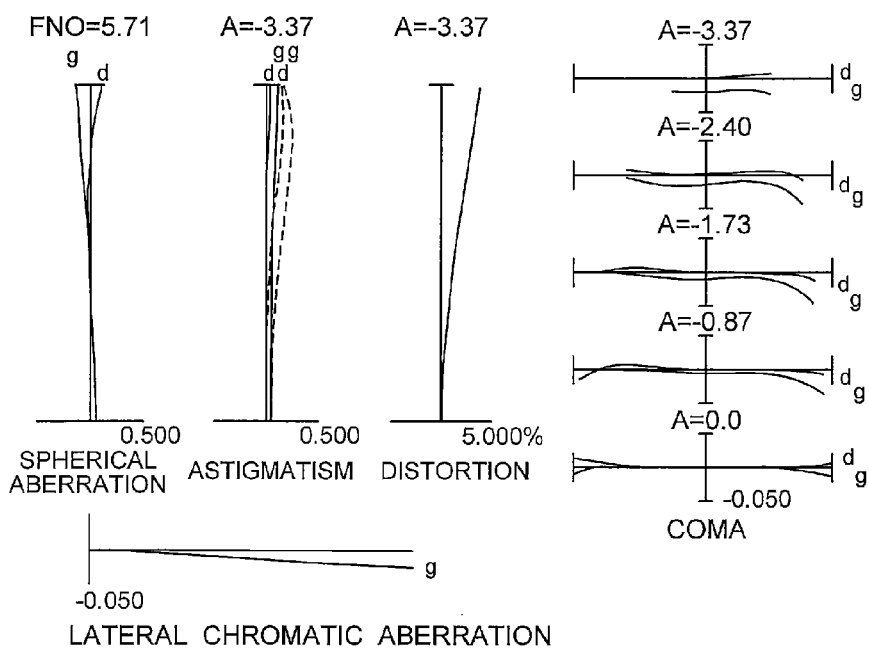
Figure 10A:
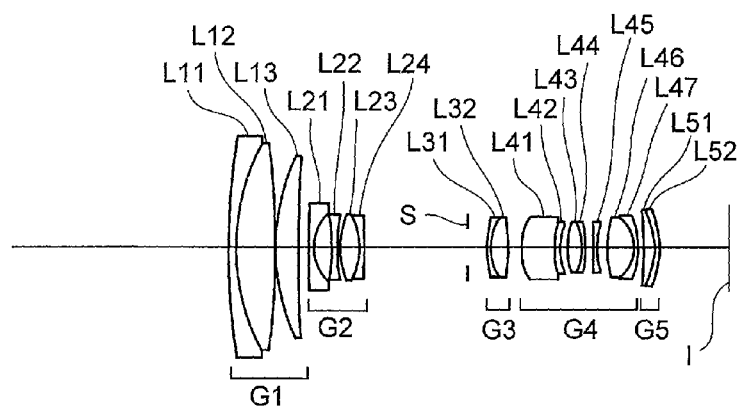
FIGS. 10A, 10B, 10C, 10D and 10E are sectional views showing a variable magnification optical system according to a Fourth Example of the first and second embodiments of the present application, in a wide-angle end state, in a first intermediate focal length state, in a second intermediate focal length state, in a third intermediate focal length state and in a telephoto end state, respectively.
Figure 10B:
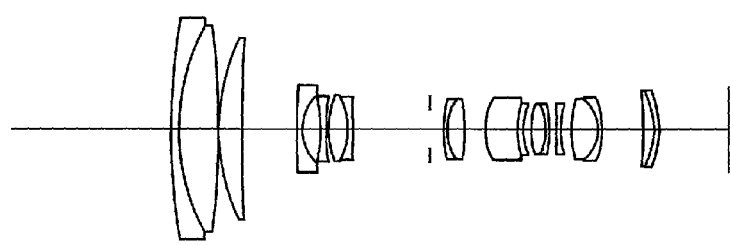
Figure 10C:
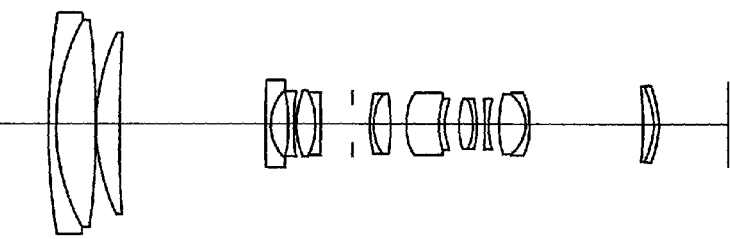
Figure 10D:
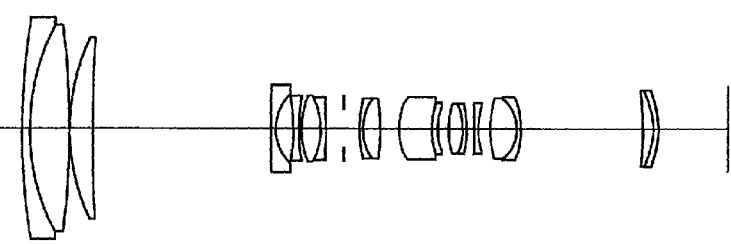
Figure 10E:
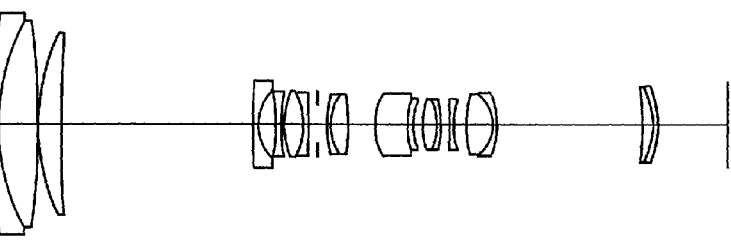

FIGS. 9A and 9B are graphs showing various aberrations of the variable magnification optical system according to the Third Example of the first and second embodiments of the present application upon focusing on the infinite distance object, in the third intermediate focal length state and in the telephoto end state, respectively.

As is apparent from the respective graphs, the variable magnification optical system according to the present Example shows excellent corrections to various aberrations from the wide-angle end state through the telephoto end state, and also shows a high optical performance.

FOURTH EXAMPLE

FIGS. 10A, 10B, 10C, 10D and 10E are sectional views showing a variable magnification optical system according to the Fourth Example of the first and second embodiments of the present application, in a wide-angle end state, in a first intermediate focal length state, in a second intermediate focal length state, in a third intermediate focal length state and in a telephoto end state, respectively.

The variable magnification optical system according to the present Example is composed of, in order from an object side: a first lens group G1 having positive refractive power; a second lens group G2 having negative refractive power; a third lens group G3 having positive refractive power; a fourth lens group G4 having positive refractive power, and a fifth lens group G5 having positive refractive power.

The first lens group G1 consists of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 consists of, in order from the object side, a negative meniscus lens L21 having a convex surface facing the object side, a double concave negative lens L22, and a cemented lens constructed by a double convex positive lens L23 cemented with a double concave negative lens L24. Meanwhile, the negative meniscus lens L21 is a glass mold type aspherical lens of which a lens surface on the object side is formed into an aspherical shape.

The third lens group G3 consists of, in order from the object side, a cemented lens constructed by a negative meniscus lens L31 having a convex surface facing the object side cemented with a double convex positive lens L32. Meanwhile, an aperture stop S is disposed on the object side of the third lens group G3.

The fourth lens group G4 consists of, in order from the object side, a cemented lens constructed by a positive meniscus lens L41 having a convex surface facing the object side cemented with a negative meniscus lens L42 having a convex surface facing the object side, a cemented lens constructed by a double convex positive lens L43 cemented with a negative meniscus lens L44 having a concave surface facing the object side, a double concave negative lens L45, and a cemented lens constructed by a double convex positive lens L46 cemented with a negative meniscus lens L47 having a concave surface facing the object side. Meanwhile, the negative lens L45 is a glass mold type aspherical lens of which a lens surface on the object side is formed into an aspherical shape, and the negative meniscus lens L47 is a glass mold type aspherical lens of which a lens surface on the image side is formed into an aspherical shape.

The fifth lens group G5 consists of, in order from the object side, a cemented lens constructed by a positive meniscus lens L51 having a concave surface facing the object side cemented with a negative meniscus lens L52 having a concave surface facing the object side. Meanwhile, the negative meniscus lens L52 is a glass mold type aspherical lens of which a lens surface on the image side is formed into an aspherical shape.

With the above-mentioned configuration, in the variable magnification optical system according to the present Example, upon zooming from the wide-angle end state to the telephoto end state, the first lens group G1 to the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively.

To be specific, the first lens group G1, the third lens group G3 and the fourth lens group G4 are moved toward the object side upon zooming. The second lens group G2 is moved toward the object side from the wide-angle end state to the second intermediate focal length state, it is moved toward the image side from the second intermediate focal length state to the third intermediate focal length state, and it is moved toward the object side from the third intermediate focal length state to the telephoto end state. The fifth lens group G5 is fixed in a position in the direction of the optical axis upon zooming. Meanwhile, the aperture stop S is moved toward the object side integrally with the fourth lens group G4 upon zooming.

Consequently, upon zooming, the distance between the first lens group G1 and the second lens group G2 is increased, the distance between the second lens group G2 and the third lens group G3 is decreased, and the distance between the fourth lens group G4 and the fifth lens group G5 is increased. The distance between the third lens group G3 and the fourth lens group G4 is increased from the wide-angle end state to the first intermediate focal length state, it is decreased from the first intermediate focal length state to the second intermediate focal length state, and it is increased from the second intermediate focal length state to the telephoto end state. Meanwhile, upon zooming, a distance between the aperture stop S and the third lens group G3 is decreased from the wide-angle end state to the first intermediate focal length state, it is increased from the first intermediate focal length state to the second intermediate focal length state, and it is decreased from the second intermediate focal length state to the telephoto end state.

Table 4 below shows various values of the variable magnification optical system according to the present Example.

TABLE 4

Fourth Example

[Surface Data]

| m | r | d | nd | vd |
|---|---|---|---|---|
| OP | ∞ | | | |
| 1 | 128.2103 | 1.6350 | 1.950000 | 29.37 |
| 2 | 42.8046 | 8.6432 | 1.497820 | 82.57 |
| 3 | −200.0000 | 0.1000 | | |
| 4 | 42.6819 | 4.9663 | 1.816000 | 46.59 |
| 5 | 290.0414 | d5 | | |
| *6 | 500.0000 | 1.0000 | 1.851350 | 40.10 |
| 7 | 9.6706 | 3.8612 | | |
| 8 | −31.6340 | 1.0000 | 1.883000 | 40.66 |
| 9 | 50.5774 | 0.3860 | | |

TABLE 4-continued

Fourth Example

| | | | | |
|---|---|---|---|---|
| 10 | 20.2802 | 4.0969 | 1.808090 | 22.74 |
| 11 | −12.7389 | 1.0000 | 1.902650 | 35.73 |
| 12 | 182.6358 | d12 | | |
| 13 | ∞ | d13 | | |
| 14 | 22.0943 | 1.0000 | 1.883000 | 40.66 |
| 15 | 12.0211 | 3.4295 | 1.593190 | 67.90 |
| 16 | −54.4618 | d16 | | |
| 17 | 13.5315 | 7.0129 | 1.816000 | 46.59 |
| 18 | 20.2242 | 1.0000 | 1.850260 | 32.35 |
| 19 | 10.9126 | 2.0000 | | |
| 20 | 18.6799 | 3.1628 | 1.516800 | 63.88 |
| 21 | −12.1205 | 1.0000 | 1.850260 | 32.35 |
| 22 | −21.9214 | 1.5000 | | |
| *23 | −2373.2040 | 1.0000 | 1.806100 | 40.71 |
| 24 | 15.4976 | 2.3426 | | |
| 25 | 18.1342 | 5.9256 | 1.567320 | 42.58 |
| 26 | −8.0000 | 1.0000 | 1.851350 | 40.10 |
| *27 | −22.6238 | d27 | | |
| 28 | −75.6072 | 2.0606 | 1.497820 | 82.57 |
| 29 | −18.0744 | 1.0000 | 1.834410 | 37.28 |
| *30 | −25.8110 | BF | | |
| I | ∞ | | | |

[Aspherical Data]

| | |
|---|---|
| m | 6 |
| κ | −9.00000 |
| A4 | 1.14894E−05 |
| A6 | 2.79933E−07 |
| A8 | −1.11589E−08 |
| A10 | 1.42629E−10 |
| A12 | −6.44930E−13 |
| m | 23 |
| κ | 1.00000 |
| A4 | −3.10495E−05 |
| A6 | 4.64001E−07 |
| A8 | −2.52074E−09 |
| A10 | 1.73753E−10 |
| A12 | 0.00000 |
| m | 27 |
| κ | 1.0000 |
| A4 | −5.63578E−05 |
| A6 | −8.97938E−08 |
| A8 | 1.47935E−09 |
| A10 | −1.36135E−11 |
| A12 | 0.00000 |
| m | 30 |
| κ | 1.00000 |
| A4 | 2.81743E−05 |
| A6 | −2.96842E−08 |
| A8 | −7.80468E−10 |
| A10 | 0.00000 |
| A12 | 0.00000 |

[Various Data]
zoom ratio 14.13

| | W | | T |
|---|---|---|---|
| f | 10.30 | ~ | 145.50 |
| FNO | 4.12 | ~ | 5.77 |
| ω | 39.65 | ~ | 3.02° |
| Y | 8.00 | ~ | 8.00 |
| TL | 107.35 | ~ | 157.35 |

| | W | M1 | M2 | M3 | T |
|---|---|---|---|---|---|
| f | 10.30004 | 17.99586 | 60.49785 | 100.49280 | 145.50011 |
| ω | 39.65487 | 23.02121 | 7.21558 | 4.36760 | 3.01679 |
| FNO | 4.12 | 4.94 | 5.67 | 5.75 | 5.77 |
| φ | 8.34 | 8.34 | 9.08 | 9.22 | 10.26 |
| d5 | 2.10000 | 12.12447 | 32.02336 | 38.52508 | 41.21393 |
| d12 | 22.23850 | 16.63220 | 7.10168 | 3.99200 | 2.20000 |
| d13 | 3.91359 | 2.69844 | 3.58860 | 3.47054 | 1.80000 |
| d16 | 3.65694 | 4.87210 | 3.98194 | 4.10000 | 5.77054 |
| d27 | 1.26857 | 9.13237 | 25.54504 | 27.42933 | 32.19314 |
| BF | 14.04952 | 14.04918 | 14.04790 | 14.04914 | 14.04886 |

TABLE 4-continued

Fourth Example

[Lens Group Data]

| | ST | f |
|---|---|---|
| G1 | 1 | 62.23195 |
| G2 | 6 | −9.03822 |
| G3 | 14 | 37.53030 |
| G4 | 17 | 49.24516 |
| G5 | 28 | 130.00164 |

[Values for Conditional Expressions]

| (1-1) | f5/fw = 12.62 |
|---|---|
| (1-2) | (d4iT − d4iW)/f4 = 0.628 |
| (1-3) | f3/f4 = 0.762 |
| (1-4) | (d3T − d3W)/fw = 0.205 |
| (2-1) | f5/fw = 12.62 |
| (2-2) | f4/f5 = 0.379 |
| (2-3) | (d4iT − d4iw)/f5 = 0.238 |
| (2-4) | f3/f4 = 0.762 |
| (2-5) | (d3T − d3W)/fw = 0.205 |

Figure 11A:
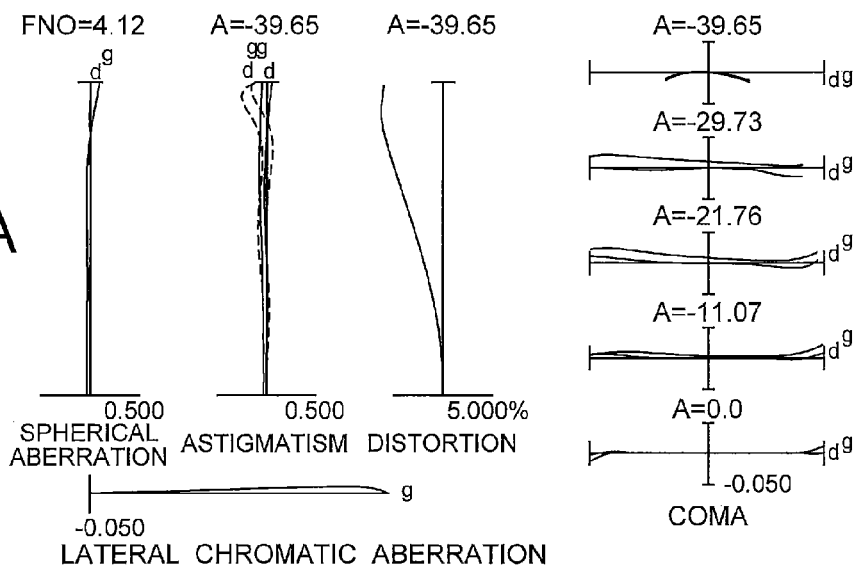
FIGS. 11A, 11B and 11C are graphs showing various aberrations of the variable magnification optical system according to the Fourth Example of the first and second embodiments of the present application upon focusing on an infinite distance object, in the wide-angle end state, in the first intermediate focal length state, and in the second intermediate focal length state, respectively.
Figure 11B:
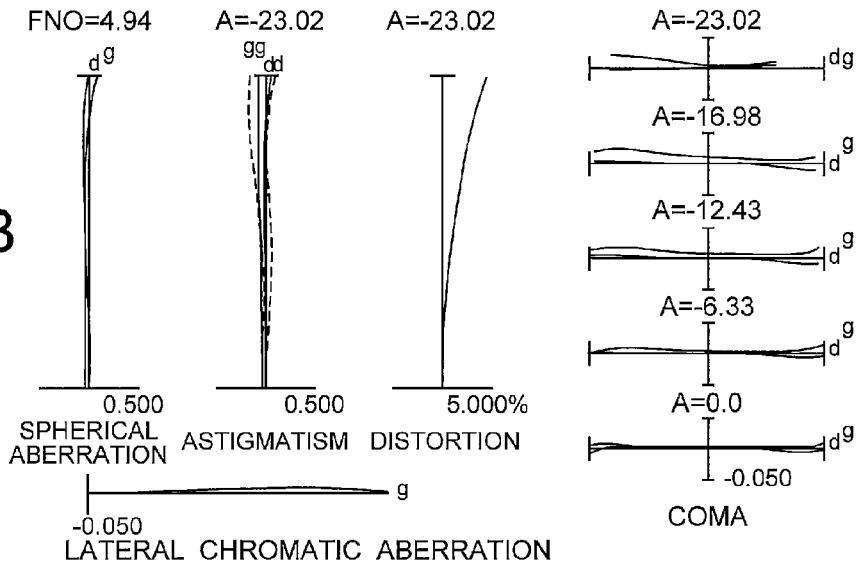
Figure 11C:
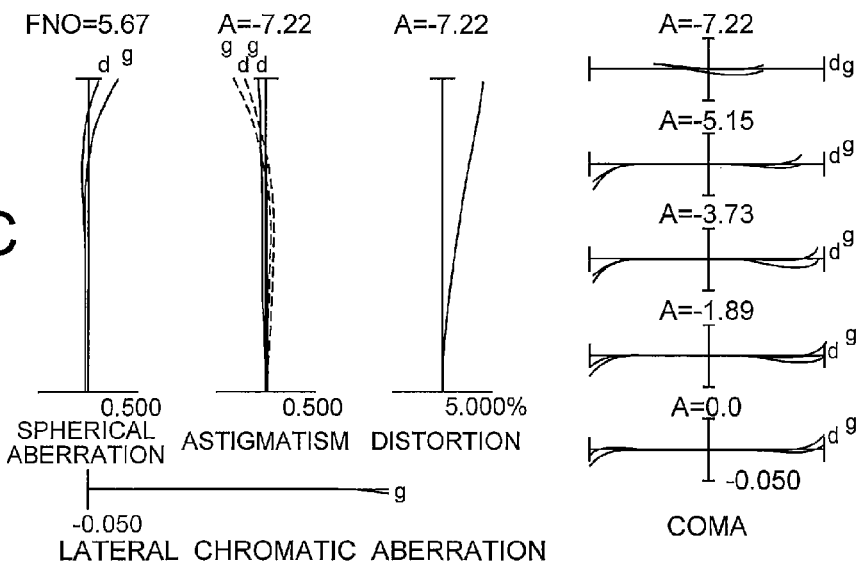

FIGS. 11A, 11B and 11C are graphs showing various aberrations of the variable magnification optical system according to the Fourth Example of the first and second embodiments of the present application upon focusing on an infinite distance object, in the wide-angle end state, in the first intermediate focal length state, and in the second intermediate focal length state, respectively.

Figure 12A:
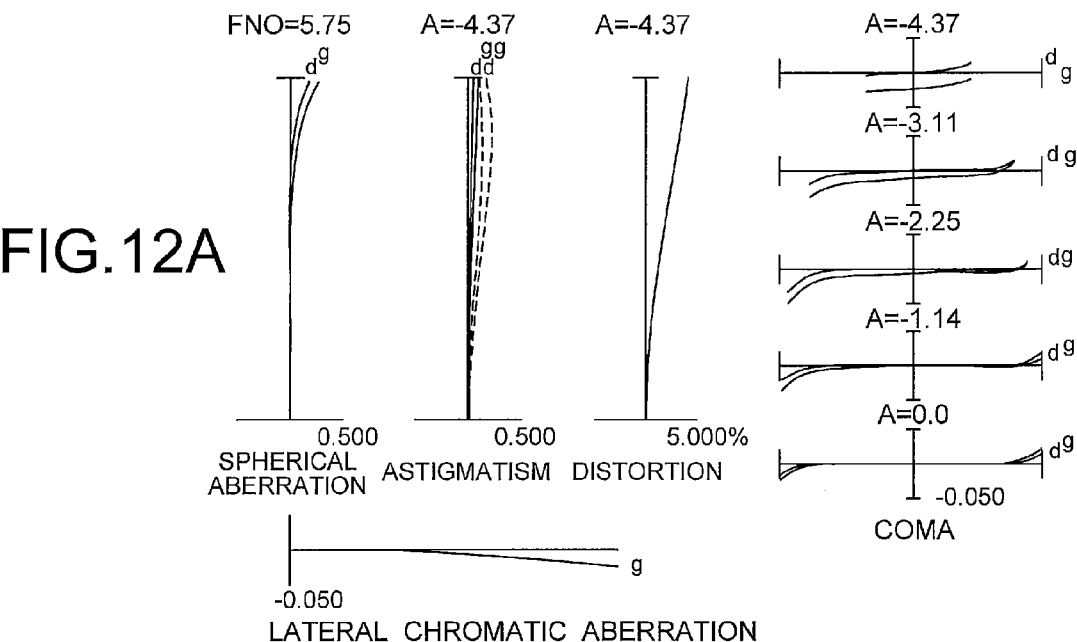
FIGS. 12A and 12B are graphs showing various aberrations of the variable magnification optical system according to the Fourth Example of the first and second embodiments of the present application upon focusing on the infinite distance object, in the third intermediate focal length state and in the telephoto end state, respectively.
Figure 12B:
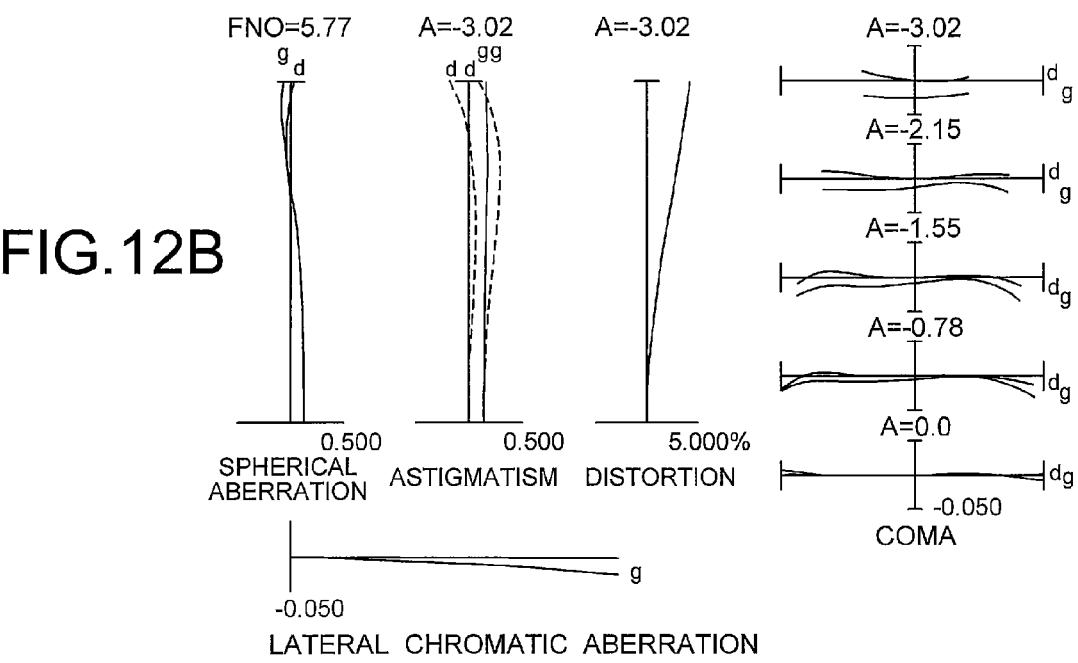

FIGS. 12A and 12B are graphs showing various aberrations of the variable magnification optical system according to the Fourth Example of the first and second embodiments of the present application upon focusing on the infinite distance object, in the third intermediate focal length state and in the telephoto end state, respectively.

As is apparent from the respective graphs, the variable magnification optical system according to the present Example shows good corrections to various aberrations from the wide-angle end state through the telephoto end state, and also shows a high optical performance.

According to the Examples as above-mentioned, it is possible to realize a small-size variable magnification optical system having a high zoom ratio and a high optical performance.

Note that each of the above described Examples is a concrete example of the invention of the present application, and the invention of the present application is not limited to them. The contents described below can be adopted without deteriorating an optical performance of the variable magnification optical systems of the present application.

Although the variable magnification optical systems each having five group configuration were illustrated above as numerical examples of the variable magnification optical systems of the present application, the present application is not limited to them and the variable magnification optical systems having other configurations (such as six group configuration, seven group configuration and the like) can be configured. Concretely, a lens configuration that a lens or a lens group is added to the most object side of the variable magnification optical system of the present application is possible, and a lens configuration that a lens or a lens group is added to the most image side of the variable magnification optical system of the present application is also possible. Meanwhile, a lens group indicates parts including at least one lens, separated by air spaces being variable upon zooming.

Further, in the variable magnification optical system, a portion of a lens group, a single lens group in the entirety thereof, or a plurality of lens groups can be moved in the direction the optical axis as a focusing lens group. It is particularly preferable that at least a portion of the second lens group or at least a portion of the third lens group or at least a portion of the fourth lens group or at least a portion of the fifth lens group is moved as the focusing lens group. The focusing lens group can be used for auto focus, and suitable for being driven by a motor for auto focus such as an ultrasonic motor.

Further, in the variable magnification optical systems of the present application, any lens group in the entirety thereof or a portion thereof can be so moved, as a vibration reduction lens group, to have a component in a direction perpendicular to the optical axis, or rotationally moved (swayed) in an intra-plane direction including the optical axis for correcting an image blur caused by a camera shake. Particularly, in the variable magnification optical systems of the present application, it is preferable that at least a portion of the third lens group or at least a portion of the fourth lens group or at least a portion of the fifth lens group is used as a vibration reduction lens group.

Further, in the variable magnification optical systems of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical systems of the present application, it is preferable that an aperture stop is disposed in the third lens group or in the vicinity of the third lens group, and the function may be substituted by a lens frame without disposing a member as an aperture stop.

Moreover, the lens surface(s) of the lenses configuring the variable magnification optical systems of the present application may be coated with anti-reflection coating(s) having a high transmittance in a broad wavelength range. With this contrivance, it is feasible to reduce a flare as well as ghost and attain a high optical performance with high contrast.

Next, a camera equipped with the variable magnification optical system according to the first and second embodiments of the present application, will be explained with referring to FIG. 13.

Figure 13:
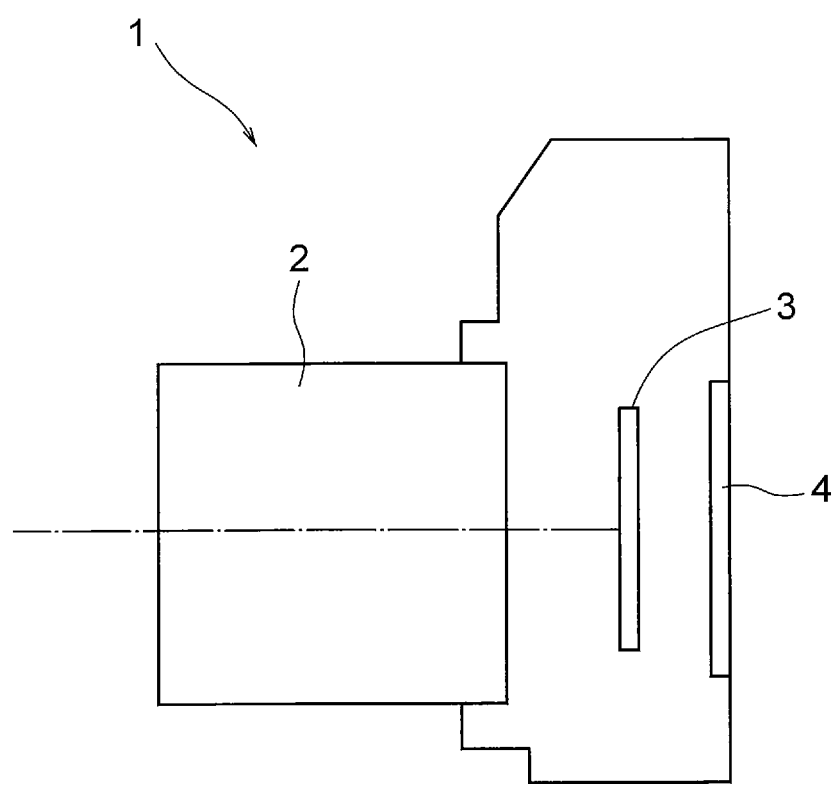
FIG. 13 is a diagram showing a construction of a camera equipped with the variable magnification optical system according to the first and second embodiments of the present application.

FIG. 13 is a sectional view showing a configuration of a camera equipped with the variable magnification optical system according to the first and second embodiments of the present application.

A camera 1 is a lens interchangeable type so-called mirror-less camera equipped with the variable magnification optical system according to the first Example as an imaging lens 2, as shown in FIG. 13.

In the camera 1, light emitted from an unillustrated object (an object to be imaged) is collected by the imaging lens 2, and forms an image of the object to be imaged on an imaging plane of an imaging part 3 through an unillustrated OLPF (optical low pass filter). The image of the object to be imaged is photo-electronically converted through a photo-electronic conversion element provided in the imaging part 3 to form an object image. This object image is displayed on an EVF (electronic view finder) 4 provided on the camera 1. Thus, a photographer can observe the object image through the EVF 4.

When the photographer presses an unillustrated release button, the object image formed through the imaging part 3 is stored in an unillustrated memory. Thus, the photographer can take a picture of the object to be imaged by the camera 1.

The variable magnification optical system according to the first embodiment mounted on the camera 1 as the imaging lens 2 is a small-size variable magnification optical system having a high zoom ratio and a high optical performance. Accordingly, the camera 1 can realize downsizing and a high optical performance while being provided with a high zoom ratio. Incidentally, even if the camera is so composed that the variable magnification optical system according to the second to fourth Examples is mounted on the camera as the imaging lens 2, the same effect can be attained as the camera 1. Moreover, the same effect as the above camera 1 is attained even in the case where the variable magnification optical system according to each of Examples as described, is mounted on a single lens reflex-type camera which is provided with a quick return mirror and in which an object to be imaged is observed through a finder optical system.

Figure 14:
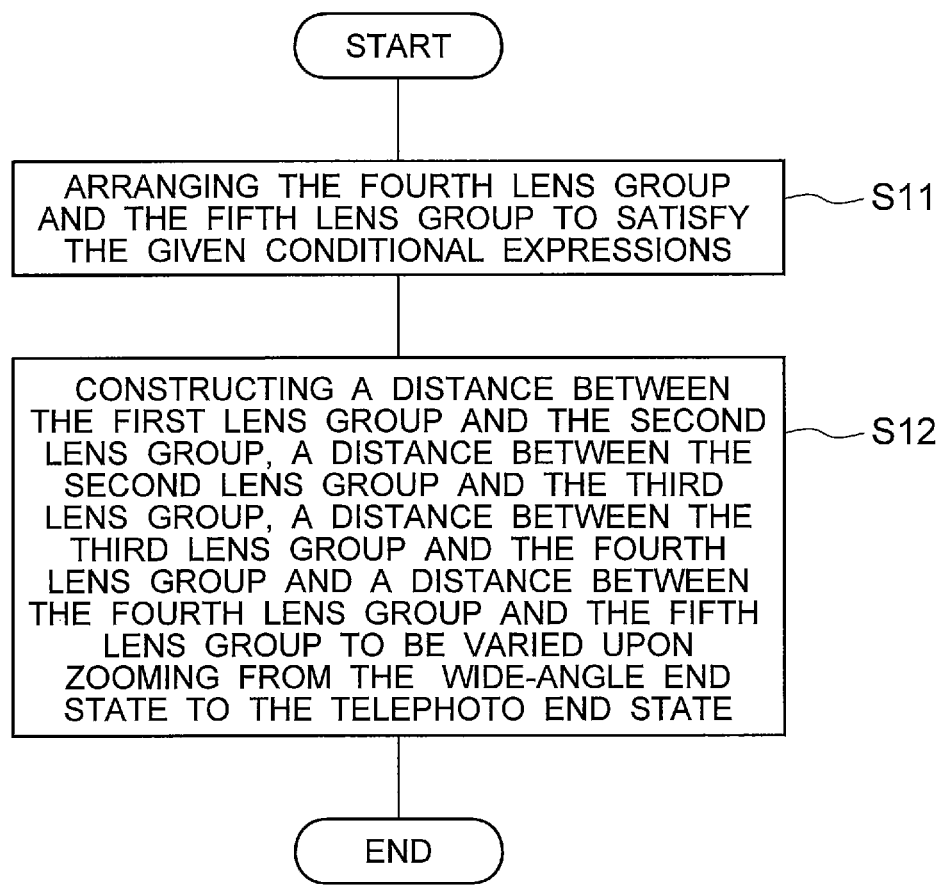
FIG. 14 is a flowchart schematically showing a method for manufacturing the variable magnification optical system according to the first embodiment of the present application.

Next, an outline of a method for manufacturing a variable magnification optical system according to the first embodiment of the present application is described with referring to FIG. 14.

In a method for manufacturing a variable magnification optical system according to the first embodiment of the present application, as shown in FIG. 14, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S11 and S12:

Step S11: arranging the fourth lens group and the fifth lens group to satisfy the following conditional expressions (1-1) and (1-2) and disposing the respective lens groups in a lens barrel in order from the object side:

$$7.60 < f5/fw < 45.00 \qquad (1\text{-}1)$$

$$0.430 < (d4it - d4iw)/f4 < 0.700 \qquad (1\text{-}2)$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Step S12: by, for example, providing a known movement mechanism at the lens barrel, constructing a distance between the first lens group and the second lens group, a distance between the second lens group and the third lens group, a distance between the third lens group and the fourth lens group and a distance between the fourth lens group and the fifth lens group to be varied upon zooming from the wide-angle end state to the telephoto end state.

Thus, the method for manufacturing the variable magnification optical system according to the first embodiment of the present application can manufacture a small-size variable magnification optical system having a high zoom ratio and a high optical performance.

Figure 15:
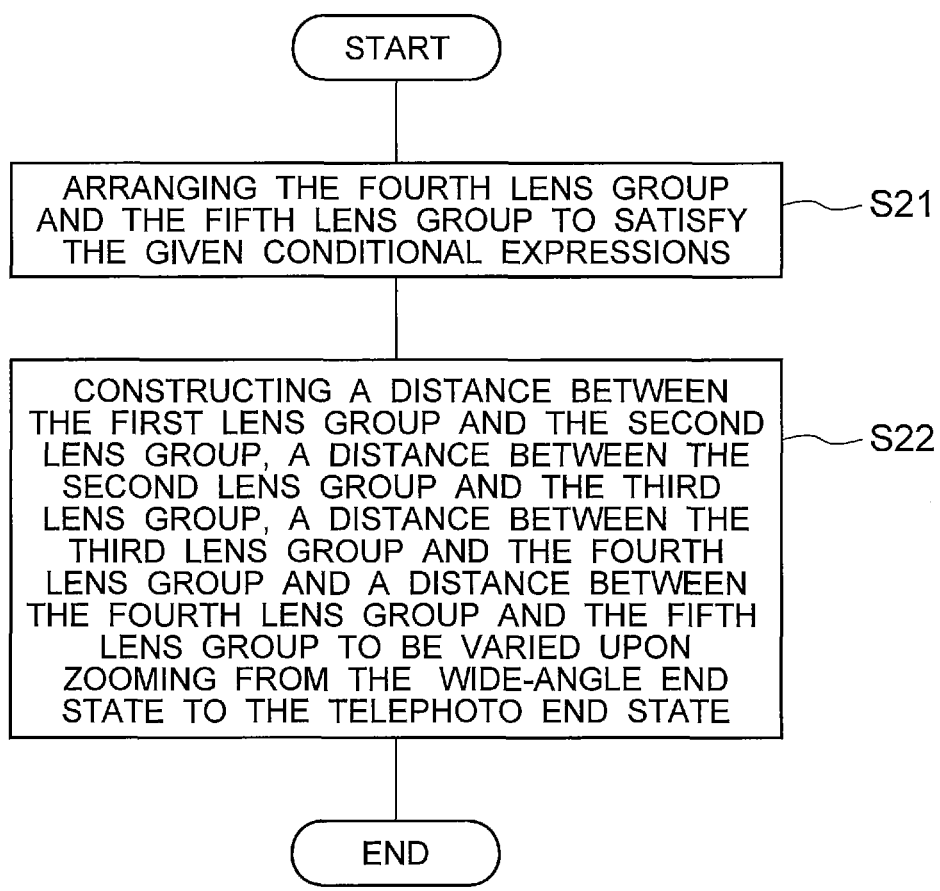
FIG. 15 is a flowchart schematically showing a method for manufacturing the variable magnification optical system according to the second embodiment of the present application.

Finally, an outline of a method for manufacturing a variable magnification optical system according to the second embodiment of the present application is described with referring to FIG. 15.

In a method for manufacturing a variable magnification optical system according to the second embodiment of the present application, as shown in FIG. 15, the variable magnification optical system comprises, in order from an object side: a first lens group having positive refractive power; a second lens group having negative refractive power; a third lens group having positive refractive power; a fourth lens group having positive refractive power; and a fifth lens group. The method comprises the following steps of S21 and S22:

Step S11: arranging the fourth lens group and the fifth lens group to satisfy the undermentioned conditional expressions (2-1), (2-2) and (2-3) and disposing the first to fifth lens groups in a lens barrel in order from the object side:

$$11.80 < f5/fw < 32.00 \quad (2\text{-}1)$$

$$0.170 < f4/f5 < 0.510 \quad (2\text{-}2)$$

$$0.065 < (d4it - d4iw)/f5 < 0.300 \quad (2\text{-}3)$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

Step S22: by, for example, providing a known movement mechanism at the lens barrel, arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied.

Thus, the method for manufacturing the variable magnification optical system according to the second embodiment of the present application can manufacture a small-size variable magnification optical system having a high zoom ratio and a high optical performance.

What is claimed is:

1. A variable magnification optical system comprising, in order from an object side: a first lens group having positive refractive power; a second lens group having negative refractive power; a third lens group having positive refractive power; a fourth lens group having positive refractive power; and a fifth lens group having positive refractive power;

upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied;

the following conditional expressions being satisfied:

$$7.60 < f5/fw < 45.00$$

$$0.430 < (d4it - d4iw)/f4 < 0.700$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

2. A variable magnification optical system according to claim 1, wherein the following conditional expression is satisfied:

$$0.410 < f3/f4 < 1.000$$

where f3 denotes a focal length of the third lens group, and f4 denotes the focal length of the fourth lens group.

3. A variable magnification optical system according to claim 1, wherein the following conditional expression is satisfied:

$$-0.050 < (d3t - d3w)/fw < 0.750$$

where fw denotes the whole system focal length of the variable magnification optical system in the wide-angle end state, d3w denotes a distance on the optical axis from a lens surface on a most image side of the third lens group to a lens surface on a most object side of the fourth lens group in the wide-angle end state, and d3t denotes a distance from the lens surface on the most image side of the third lens group to the lens surface on the most object side of the fourth lens group in the telephoto end state.

4. A variable magnification optical system according to claim 1, wherein the first lens group is moved toward the object side upon zooming from the wide-angle end state to the telephoto end state.

5. A variable magnification optical system according to claim 1, wherein the distance between the first lens group and the second lens group is increased upon zooming from the wide-angle end state to the telephoto end state.

6. A variable magnification optical system according to claim 1, wherein the distance between the second lens group and the third lens group is decreased upon zooming from the wide-angle end state to the telephoto end state.

7. A variable magnification optical system according to claim 1, wherein the distance between the fourth lens group and the fifth lens group is increased upon zooming from the wide-angle end state to the telephoto end state.

8. A variable magnification optical system according to claim 1, wherein the fifth lens group is fixed in a position upon zooming from the wide-angle end state to the telephoto end state.

9. A variable magnification optical system according to claim 1, wherein the following conditional expression is satisfied:

$$11.80 < f5/fw < 32.00$$

where fw denotes the whole system focal length of the variable magnification optical system in the wide-angle end state, and f5 denotes the focal length of the fifth lens group.

10. A variable magnification optical system according to claim 1, wherein the following conditional expression is satisfied:

$$0.170 < f4/f5 < 0.510$$

where f4 denotes the focal length of the fourth lens group, and f5 denotes the focal length of the fifth lens group.

11. A variable magnification optical system according to claim 1, wherein the following conditional expression is satisfied:

$$0.065 < (d4it-d4iw)/f5 < 0.300$$

where f5 denotes the focal length of the fifth lens group, d4iw denotes the distance on the optical axis from the lens surface on the most image side of the fourth lens group to the image plane in the wide-angle end state, and d4it denotes the distance on the optical axis from the lens surface on the most image side of the fourth lens group to the image plane in the telephoto end state.

12. An optical apparatus comprising a variable magnification optical system according to claim 1.

13. A variable magnification optical system comprising, in order from an object side: a first lens group having positive refractive power; a second lens group having negative refractive power; a third lens group having positive refractive power; a fourth lens group having positive refractive power; and a fifth lens group having positive refractive power;

upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group being varied;

the following conditional expressions being satisfied:

$$11.80 < f5/fw < 32.00$$

$$0.170 < f4/f5 < 0.510$$

$$0.065 < (d4it-d4iw)/f5 < 0.300$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

14. A variable magnification optical system according to claim 13, wherein the following conditional expression is satisfied:

$$0.410 < f3/f4 < 1.000$$

where f3 denotes a focal length of the third lens group, and f4 denotes the focal length of the fourth lens group.

15. A variable magnification optical system according to claim 13, wherein the following conditional expression is satisfied:

$$-0.050 < (d3t-d3w)/fw < 0.750$$

where fw denotes the whole system focal length of the variable magnification optical system in the wide-angle end state, d3w denotes a distance on the optical axis from a lens surface on a most image side of the third lens group to a lens surface on a most object side of the fourth lens group in the wide-angle end state, and d3t denotes a distance from the lens surface on the most image side of the third lens group to the lens surface on the most object side of the fourth lens group in the telephoto end state.

16. An optical apparatus comprising a variable magnification optical system according to claim 13.

17. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group having positive refractive power; the method comprising the steps of:

arranging the fourth lens group and the fifth lens group to satisfy the undermentioned conditional expressions; and arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied:

$$7.60 < f5/fw < 45.00$$

$$0.430 < (d4it-d4iw)/f4 < 0.700$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

18. A method for manufacturing a variable magnification optical system comprising, in order from an object side: a first lens group having positive refractive power; a second lens group having negative refractive power; a third lens group having positive refractive power; a fourth lens group having positive refractive power; and a fifth lens group having positive refractive power; the method comprising the steps of:

arranging the fourth lens group and the fifth lens group to satisfy the undermentioned conditional expressions; and arranging, upon zooming from a wide-angle end state to a telephoto end state, a distance between the first lens group and the second lens group, a distance between the second lens group and the third lens group, a distance between the third lens group and the fourth lens group and a distance between the fourth lens group and the fifth lens group to be varied:

$$11.80 < f5/fw < 32.00$$

$$0.170 < f4/f5 < 0.510$$

$$0.065 < (d4it-d4iw)/f5 < 0.300$$

where fw denotes a whole system focal length of the variable magnification optical system in the wide-angle end state, f4 denotes a focal length of the fourth lens group, f5 denotes a focal length of the fifth lens group, d4iw denotes a distance on the optical axis from a lens surface on a most image side of the fourth lens group to an image plane in the wide-angle end state, and d4it denotes a distance on the optical axis from the lens surface on the most image side of the fourth lens group to the image plane in the telephoto end state.

* * * * *